US010034208B2

(12) United States Patent
Moon et al.

(10) Patent No.: US 10,034,208 B2
(45) Date of Patent: Jul. 24, 2018

(54) APPARATUS AND METHOD FOR CONNECTION RE-ESTABLISHMENT IN MOBILE COMMUNICATION SYSTEM

(71) Applicant: Samsung Electronics Co., Ltd., Suwon-si, Gyeonggi-do (KR)

(72) Inventors: Jung-Min Moon, Suwon-si (KR); Sung-Jin Lee, Bucheon-si (KR); Jung-Soo Jung, Seongnam-si (KR); Sun-Heui Ryoo, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/032,942

(22) PCT Filed: Nov. 5, 2014

(86) PCT No.: PCT/KR2014/010512
§ 371 (c)(1),
(2) Date: Apr. 28, 2016

(87) PCT Pub. No.: WO2015/069005
PCT Pub. Date: May 14, 2015

(65) Prior Publication Data
US 2016/0269952 A1 Sep. 15, 2016

(30) Foreign Application Priority Data
Nov. 5, 2013 (KR) .................. 10-2013-0133778

(51) Int. Cl.
*H04W 36/00* (2009.01)
*H04W 36/08* (2009.01)
(Continued)

(52) U.S. Cl.
CPC ....... *H04W 36/08* (2013.01); *H04W 36/0055* (2013.01); *H04W 36/0083* (2013.01);
(Continued)

(58) Field of Classification Search
CPC ............. H04W 36/08; H04W 36/0055; H04W 36/0083; H04W 76/027; H04W 36/14;
(Continued)

(56) References Cited

U.S. PATENT DOCUMENTS 5,794,116 A * 8/1998 Matsuda ................ H04H 20/38
348/E7.07
6,031,863 A * 2/2000 Jusa ...................... H04B 1/7156
370/338

(Continued)

FOREIGN PATENT DOCUMENTS

CN 102415147 A * 4/2012 ............ H04W 36/08
KR 10-2010-0072319 A 6/2010
(Continued)

Primary Examiner — Mahendra Patel
(74) Attorney, Agent, or Firm — Jefferson IP Law, LLP

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). The present disclosure is to perform connection re-establishment in a mobile communication system, wherein a method for operating a terminal in a mobile communication system includes: receiving, from a base station, a message informing whether to support to fetching a context of the terminal; and determining whether at least one base station supports to fetching the context based on the message. In addition, the present invention includes other embodiments as well as the above-described embodiments.

19 Claims, 23 Drawing Sheets

(51) Int. Cl.
*H04W 76/18* (2018.01)
*H04W 76/02* (2009.01)
*H04W 36/04* (2009.01)

(52) U.S. Cl.
CPC ......... *H04W 76/027* (2013.01); *H04W 76/18* (2018.02); *H04W 36/0061* (2013.01); *H04W 36/04* (2013.01)

(58) Field of Classification Search
CPC . H04W 36/0033; H04W 12/06; H04W 12/10; H04W 36/0061; H04W 36/04; H04W 76/02; H04W 8/24; H04W 8/20; H04W 48/08; H04W 36/0038; H04W 12/08; H04W 4/00; H04W 76/18; H04L 12/26; H04L 12/42; H04B 7/14; H04J 3/02
USPC .......................... 455/436, 450, 423; 370/331
See application file for complete search history.

(56) References Cited

U.S. PATENT DOCUMENTS

| | | | |
|---|---|---|---|
| 6,587,680 B1* | 7/2003 | Ala-Laurila | H04L 63/08 380/248 |
| 2006/0133409 A1* | 6/2006 | Prakash | H04L 12/2898 370/450 |
| 2009/0086676 A1 | 4/2009 | Meylan et al. | |
| 2009/0124259 A1* | 5/2009 | Attar | H04L 47/10 455/436 |
| 2009/0170426 A1* | 7/2009 | Jung | H04W 8/24 455/7 |
| 2010/0067371 A1* | 3/2010 | Gogic | H04W 36/0083 370/216 |
| 2010/0069072 A1* | 3/2010 | Gogic | H04W 36/0083 455/436 |
| 2010/0124172 A1* | 5/2010 | Tenny | H04W 24/08 370/242 |
| 2010/0124173 A1 | 5/2010 | Agashe et al. | |
| 2010/0124203 A1* | 5/2010 | Tenny | H04W 36/24 370/331 |
| 2010/0124918 A1* | 5/2010 | Agashe | H04W 36/0083 455/423 |
| 2010/0177737 A1* | 7/2010 | Song | H04W 36/0038 370/331 |
| 2010/0234027 A1 | 9/2010 | Han et al. | |
| 2010/0278147 A1* | 11/2010 | Horn | H04W 36/08 370/331 |
| 2010/0291939 A1* | 11/2010 | Jen | H04W 76/19 455/450 |
| 2011/0275371 A1* | 11/2011 | Roger | H04W 60/04 455/435.1 |
| 2012/0127956 A1* | 5/2012 | Wang | H04W 36/0033 370/331 |
| 2012/0252481 A1* | 10/2012 | Anpat | H04W 8/06 455/456.1 |
| 2013/0003695 A1* | 1/2013 | Nylander | H04W 36/0083 370/331 |
| 2013/0039339 A1* | 2/2013 | Rayavarapu | H04W 76/19 370/331 |
| 2014/0198650 A1* | 7/2014 | Billau | H04W 40/02 370/235 |

FOREIGN PATENT DOCUMENTS

| | | | | |
|---|---|---|---|---|
| KR | 10-2011-0089351 A | | 8/2011 | |
| WO | WO 2010057125 A1 * | | 5/2010 | ........ H04W 36/0083 |

* cited by examiner

APPARATUS AND METHOD FOR CONNECTION RE-ESTABLISHMENT IN MOBILE COMMUNICATION SYSTEM

TECHNICAL FIELD

The present disclosure relates to connection re-establishment in a mobile communication system.

BACKGROUND ART

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Generally, mobile communication systems include base stations which provide wireless access in a cell of a predetermined range. The base station may be referred to as a different name according to the standard of a system. Each of the base stations provides wireless access to terminals located within the cell. Therefore, when a terminal moves from a cell of one base station to a cell of another base station, handover is performed to ensure continuity of services.

A normal handover procedure is as follows. First, a terminal determines whether a handover event occurs or not based on an intensity of a downlink signal. When the handover event occurs, the terminal reports the occurrence of the handover event to a serving base station, and the serving base station determines whether to perform the handover and then requests a target base station to perform the handover. Accordingly, the target base station determines whether to accept the handover and notifies the result of determining. The serving base station provides information necessary for performing the handover to the terminal, and thereafter, the terminal proceeds with a procedure for connecting to the target base station.

The handover normally occurs when the signal intensity of the target base station is greater than the signal intensity of the serving base station. This means that the terminal approaches the boundary of a serving cell. In this case, a channel gain between the terminal and the serving base station is low. In this case, when the signal intensity of the serving base station is greater than or equal to a predetermined level, the handover may be performed, but, when the signal intensity of the serving base station is low, a Radio Link Failure (RLF) may occur. As a result, it is highly likely that the handover occurring when the signal intensity of the target base station is higher than the signal intensity of the serving base station coincides with the ELF occurring when the channel gain between the terminal and the serving base station is low. In particular, in the case of a heterogeneous network where a small cell and a macro cell coexist, handover areas increase due to a small cell coverage of the small cell and high cell density, and furthermore, an interference between cells increases. Accordingly, areas satisfying the handover condition and the RLF condition also increase.

In the case of a $3^{rd}$ Generation Partnership Project Long Term Evolution-Advanced (3GPP LET-A) system which is currently popularized, the handover and the RLF are declared when a predefined condition is maintained during a predetermined time. When the condition of the handover and the RLF is satisfied but is not maintained during the predetermined time, a pre-generated condition is invalidated. Herein, a procedure of declaring the handover and a procedure of declaring the RLF are independently defined and independently managed.

As described above, when the channel gain with the serving base station is low, the handover or the RLF may be declared. Since the procedure of declaring the handover and the procedure of declaring the RLF are independent from each other, when the terminal declares the RLF in the middle of proceeding with the handover procedure, the terminal may perform a connection re-establishment procedure regardless of the remaining handover procedure. Similarly, when the terminal declares the handover in the middle of proceeding with the RLF procedure, the terminal may perform the handover procedure. However, the satisfaction of the RLF condition means that the channel quality with the serving base station is poor, and thus the handover procedure including signaling between the terminal and the serving base station may not be smoothly performed.

DETAILED DESCRIPTION OF THE INVENTION

Technical Objects

An exemplary embodiment of the present disclosure provides an apparatus and method for effectively handling with an RLF in a mobile communication system.

Another exemplary embodiment of the present disclosure provides an apparatus and method for re-establishing connection after a terminal experiences an RLF in a mobile communication system.

Another exemplary embodiment of the present disclosure provides an apparatus and method for reducing an interruption time caused by an RLF in a mobile communication system.

Another exemplary embodiment of the present disclosure provides an apparatus and method for informing whether context fetch is supported or not in a mobile communication system.

Another exemplary embodiment of the present disclosure provides an apparatus and method for performing connection re-establishment without transmitting a Measurement Report (MR) in a mobile communication system.

Another exemplary embodiment of the present disclosure provides an apparatus and method for transmitting an MR through a reserved resource in a mobile communication system.

Another exemplary embodiment of the present disclosure provides an apparatus and method for transferring information on a reserved resource for an MR in a mobile communication system.

Another exemplary embodiment of the present disclosure provides an apparatus and method for abandoning transmission of an MR and generating a context in a mobile communication system.

Technical Solving Means

According to an exemplary embodiment of the present disclosure, a method for operating a terminal in a mobile communication system includes: receiving, from a base station, a message informing whether to support to fetching a context of the terminal; and determining whether at least one base station supports to fetching the context based on the message.

According to another exemplary embodiment of the present disclosure, a method for operating a base station in a mobile communication system includes: generating a message informing whether at least one base station supports to fetching a context; and transmitting the message.

According to another exemplary embodiment of the present disclosure, an apparatus for a terminal in a mobile communication system includes: a communication unit configured to receive, from a base station, a message informing whether to support to fetching a context of the terminal; and a controller configured to determine whether at least one base station supports to fetching the context based on the message.

According to another exemplary embodiment of the present disclosure, an apparatus for a base station in a mobile communication system includes: a controller configured to generate a message informing whether at least one base station supports to fetching a context; and a wireless communication unit configured to transmit the message.

Advantageous Effect

In a mobile communication system, by performing signaling informing whether a base station supports context fetch or not, a terminal can effectively handle with an RLF according to whether the context fetch is supported or not.

BEST MODE FOR EMBODYING THE INVENTION

Hereinafter, the operation principles of the present disclosure will be explained in detail with reference to the accompanying drawings. In the following description, well-known functions or constructions are not described in detail since they would obscure the invention in unnecessary detail. Also, the terms used herein are defined according to the functions of the present invention. Thus, the terms may vary depending on user's or operator's intension and usage. That is, the terms used herein must be understood based on the descriptions made herein.

Hereinafter, the present invention describes a technology for re-establishing connection in a mobile communication system.

In the following description, a term identifying a timer, a term indicating a network entity, a term indicating a connection state, a term indicating a protocol layer, etc. are just for convenience of explanation. Therefore, the present disclosure is not limited to the terms which will be described below, and other terms indicating objects having the same technical meaning may be used. For example, the term "terminal" used hereinafter may be referred to as "User Equipment (UE)," "Mobile Station (MS)," "Mobile Terminal (MT)," etc., and the term "base station" may be referred to as "Node B (NB)," "evolved Node B (eNB)," etc.

In the following description, terms and names which are defined in the 3GPP LET-A standards are used for convenience of explanation. However, the present invention is not limited to the above-mentioned terms and names and the same can be applied to systems meeting the other standards.

Figure 1:
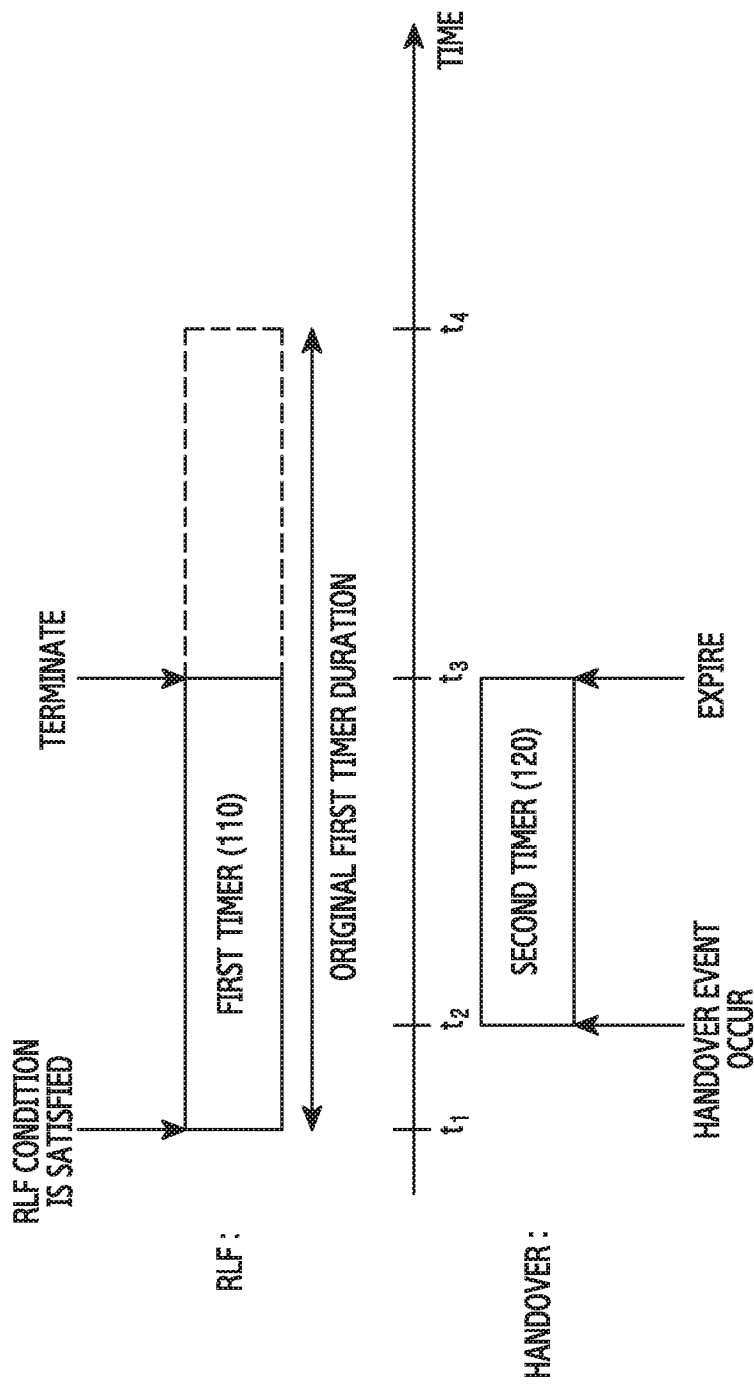
FIG. 1 illustrates an example of expiration times of timers in a mobile communication system according to an exemplary embodiment of the present disclosure.

FIG. 1 illustrates an example of expiration times of timers in a mobile communication system according to an exemplary embodiment of the present disclosure. In FIG. 1, a first timer 110 is a timer for counting the time during which an RLF condition should be maintained to declare an RLF, and a second timer 120 refers to a timer for counting the time during which a handover condition should be maintained to declare a handover. The first timer 110 may be referred to as "T310" and the second timer 120 may be referred to as "Time-To-Trigger (TTT)."

Referring to FIG. 1, the RLF condition is satisfied at time t1, and accordingly, the first timer 110 progresses. Herein, the RLF condition may be defined variously according to specific exemplary embodiments of the present disclosure. In the case of the 3GPP LTE-A standard, the RLF condition is defined as shown in table 1 presented below:

TABLE 1

| | Condition | Time required to maintain the condition (Timer) |
|---|---|---|
| RLF | $BLER_{PDCCH} < BLER_{threshold}$ or $CQI < Q_{out}$ | T310 |

In table 1, the $BLER_{PDCCH}$ is a block error rate in a Physical Downlink Control Channel (PDCCH), the $BLER_{threshold}$ is a threshold value of a block error rate in the PDCCH for determining the RLF, the Channel Quality Indicator (CQI) is a value indicating channel quality, and the $Q_{out}$ is a threshold value of channel quality for determining the RLF. For example, the channel quality may be one of a Signal-to-Interference-plus-Noise Ratio (SINR), a Carrier-to-Interference-plus-Noise Ratio (CINR), or a Signal-to-Noise Ratio (SNR).

Thereafter, a handover event occurs at time t2. In other words, the handover condition is satisfied, and accordingly, the second timer 120 progresses. Herein, the handover condition may be defined variously according to specific exemplary embodiments of the present disclosure. In the case of the 3GPP LTE-A standard, the handover condition is defined as shown in table 2 presented below:

TABLE 2

| Condition | | Time required to maintain the condition (Timer) |
|---|---|---|
| Handover | $RSRP_{target} > RSRP_{serving} + \Delta$ | TTT |

In table 2, the $RSRP_{target}$ is a target value of Reference Signal Received Power (RSRP), and the $RSRP_{serving}$ is received power of a, reference signal received from a serving base station.

At time t3, the second timer 120 expires. That is, in the example of FIG. 1, the second timer 120 is defined to have a length of times t2-t3. Therefore, the second timer 120 expires as time t3 arrives. In this case, according to an exemplary embodiment of the present disclosure, the first timer 110 terminates when the second timer 120 expires.

In the example of FIG. 1, the first timer 110 is defined to have a length of times t1 to t4. Accordingly, when the second timer 120 does not progress, the first timer 110 may expire at time t4. However, since the second timer 120 progresses simultaneously and expires first, the first timer 110 terminates at time t3.

As the first timer 110 terminates, a terminal may perform a connection re-establishment procedure. The connection re-establishment may be controlled in a Radio Resource Control (RRC) layer. In this case, the connection re-establishment may be referred to as "RRC connection re-establishment." When the first timer 110 is running, it may be difficult for the terminal to successfully receive a handover-related message from a serving base station. Therefore, although the first timer 110 does not yet expire, the connection re-establishment is performed. This is to perform the connection re-establishment without waiting until time t4.

The connection re-establishment is a procedure for establishing connection again after the terminal experiences the RLF, and causes a predetermined service interruption time. The interruption time varies according to various conditions. For example, the interruption time may vary according to whether a base station to perform the connection re-establishment owns the context of the terminal or not. The context of the terminal is a set of a series of information items necessary for communicating with the terminal, and includes at least one of the items shown in table 3 presented below.

TABLE 3

| Fields | Descriptions |
|---|---|
| International Mobile Subscriber Identity (IMSI) | Permanent identification information of a subscriber |
| EPS Mobility Management (EMM) state | Mobility management state such EMM-registration, EMM-deregistration, etc. |
| Globally Unique Temporary Identifier (GUTI) | Globally unique temporary identification information |
| ME Identity | Mobile equipment identification information- (for example, IMEI/IMEISV) software version number |

TABLE 3-continued

| Fields | | Descriptions |
|---|---|---|
| Tracking Area (TA) List | | Current TA list |
| Last visited TA Identifier (TAI) | | TAI which identifies a TA last visited by the terminal, and is included in a TA list registered at a network by the terminal |
| Selected Non-Access Stratum (NAS) Algorithm | | Selected NAS security algorithm |
| Selected AS algorithm | | Selected AS Security algorithm |
| eKSI | | Key set identifier for a main key. This field indicates whether the terminal uses a security key derived from a Universal Terrestrial Radio Access Network (UTRAN) or Evolved (E)-UTRAN security connection. |
| $K_{ASME}$ | | Main key for an E-UTRAN key stratum based on a Cipher Key (CK), an Integrity Key (IK), and serving network identification information |
| NAS key and count | | $K_{NASint}$, $K_{NASenc}$, NAS COUNT parameters |
| Temporary Identity use in Next update (TIN) | | Parameter internally used for UE to store indicated temporary ID in response to a Routing Area Update (RAU)/Tracking Area Update (TAU) request and an attach request |
| UE Specific Discrete Receive (DRX) | | Length of preferred E-UTRAN DRX cycle |
| Allowed Closed Subscriber Group (CSG) list | | Allowed CSG list under control of a user and an operator. A terminal indicates a list of Public Land Mobile Network (PLMN) which is a member and CSG ID |
| Operator CSG list | | Operator CSG list under control of an exclusive operator. A terminal indicates a list of PLMN which is a member and CSG ID |
| Regarding connection to each of activated PUNs | Access Point Name (APN) in use | Currently used APN. The present APN consists of an APN network identifier and a basic APN operator identifier. |
| | APN-Aggregated Maximum Bit Rate (AMBR) | Maximum uplink and downlink aggregated MBR shared throughout all of the non-Guaranteed Bit Rate (GBR) bearers set for the present APN |
| | Assigned Packet Data Network (PDN) type | PDN type assigned by a network (IPv4, IPv6, or IPv4v6) |
| | Internet Protocol (IP) addresses | IPv4 address and/or IPv6 prefix |
| | Default Bearer | Identification information of a default bearer in PDN connection by an EPS bearer ID. The default bearer is a bearer which is assigned first in PDN connection. |
| Regarding EPS bearers in PDN connection | Evolved Packet System (EPS) Bearer ID | The EPS bearer ID uniquely identifies an EPS bearer for a terminal which accesses through E-UTRAN |
| | Transaction identifier (TI) | Transaction identifier |
| | EPS Bearer Quality of Service (QoS) | GBR and MBR for a GBR bearer |
| | Traffic Flow Template (TFT) | Traffic Flow Template |

As shown in FIG. 1, when the handover timer expires first while the RLF timer is running, and thus the RLF timer terminates, it may be determined whether a target base station owns the context of the terminal according to a specific reaction of the terminal. Hereinafter, FIGS. 2 and 3 illustrate examples of a connection re-establishment process according to a reaction of the terminal.

Figure 2:
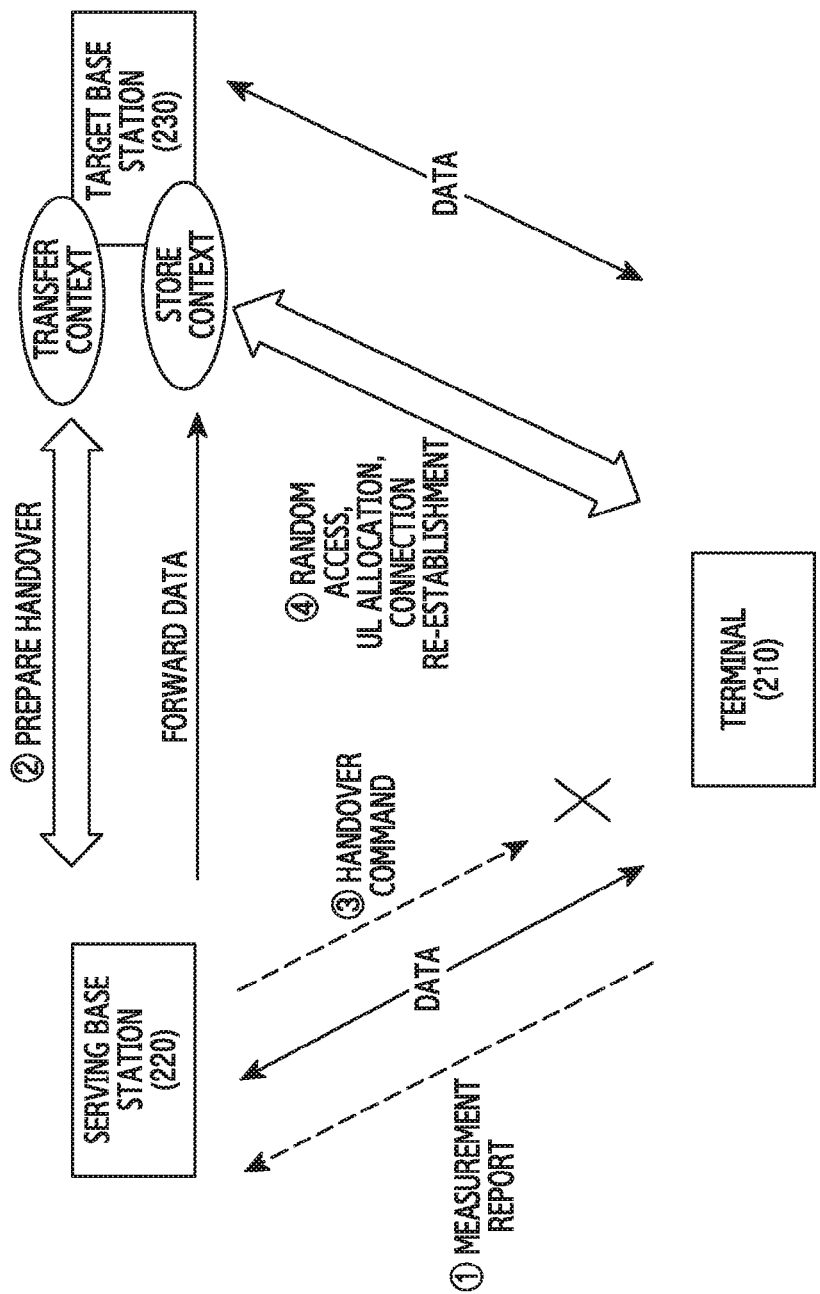
FIG. 2 illustrates an example of connection re-establishment in a mobile communication system according to an exemplary embodiment of the present disclosure.

FIG. 2 illustrates an example of a connection re-establishment process in a mobile communication system according to an exemplary embodiment of the present disclosure. Referring to FIG. 2, while a terminal 210 and a serving base station 220 are transmitting and/or receiving data with each other, an RLF timer terminates through a process similar to that of FIG. 1. After the RLF timer terminates, the terminal 210 transmits an MR to the serving base station 220. Accordingly, the serving base station 220 performs a handover preparation procedure with a target base station 230. In this case, the serving base station 220 transfers the context of the terminal 210 and forwards data. Thereafter, the serving base station 220 transmits a handover command to the terminal 210, and the terminal 210 performs a random access to the target base station 230, is allocated an uplink resource, and performs connection re-establishment. In this case, since the target base station 230 owns the context of the terminal 210, a cell selection procedure and an NAS recovery procedure are not performed.

Figure 3:
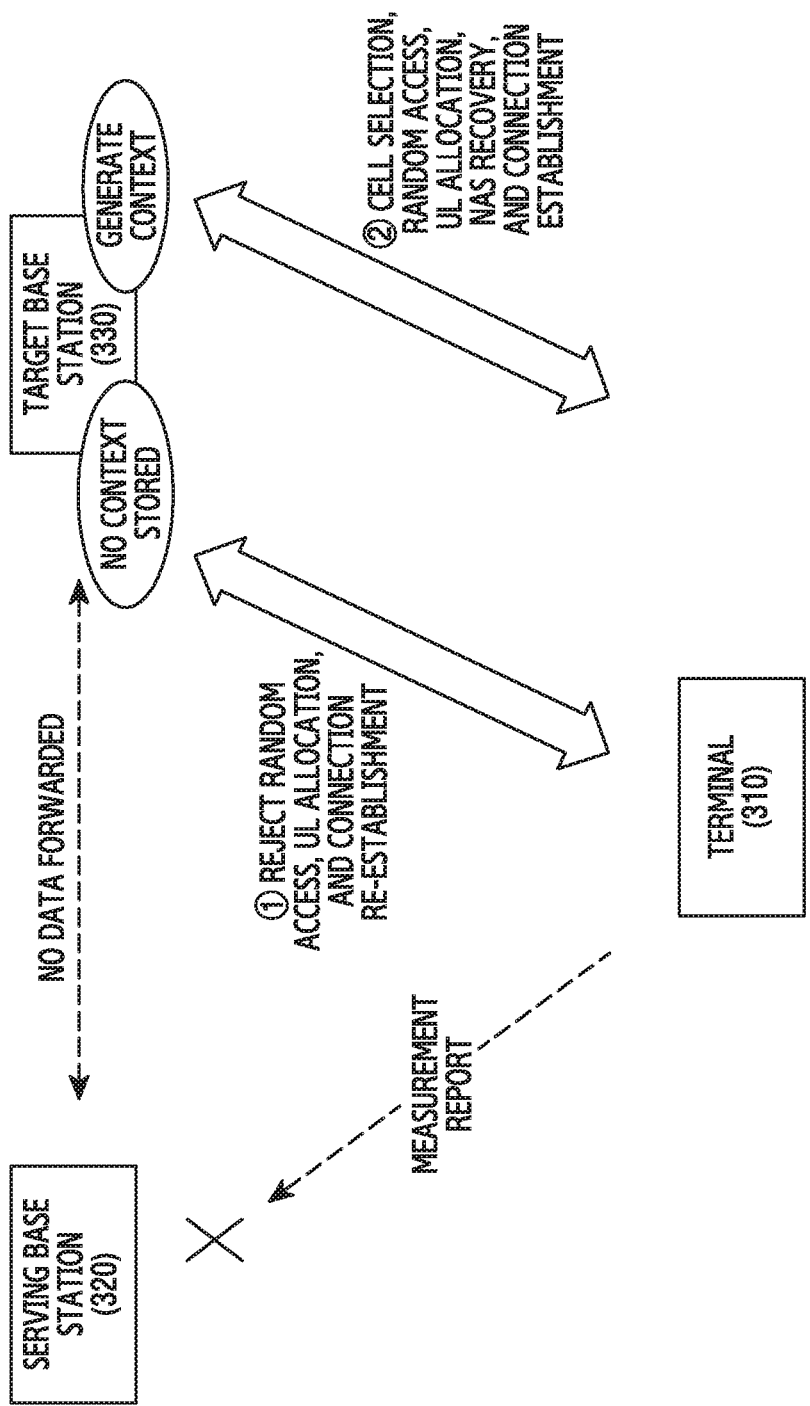
FIG. 3 illustrates another example of connection re-establishment in a mobile communication system according to an exemplary embodiment of the present disclosure.

FIG. 3 illustrates another example of connection re-establishment in a mobile communication system according to an exemplary embodiment of the present disclosure. Referring to FIG. 3, while a terminal 310 and a serving base station 320 are transceiving data with each other, an RLF timer terminates through a process similar to that of FIG. 1. After the RLF timer terminates, the terminal 310 tries to access a target base station 330 without transmitting an MR. In this case, since the target base station 330 does not save the context of the terminal 310, the terminal 310 performs a random access to the target base station 330, is allocated an uplink resource, and tries to re-establish connection, but the connection re-establishment is rejected. Accordingly, the terminal 310 selects a cell, performs a random access to the target base station 330, obtains a grant of an uplink resource, performs an NAS recovery procedure, and then performs connection establishment.

In the following description, a base station which stores the context of a terminal will be referred to as a "prepared cell," and a base station which does not store the context of the terminal will be referred to as an "unprepared cell." The prepared cell and the unprepared cell are relative concepts with respect to a specific terminal. Accordingly, a cell which is prepared with respect to a certain terminal may be an unprepared cell with respect to another terminal. Examples of interruption time for the prepared cell and the unprepared cell are as shown in table 4 presented below:

TABLE 4

| Option | Interruption Time |
| --- | --- |
| Re-establishment with respect to a prepared cell in case of returning to the same cell in case of seleting a prepared cell | Acquisition of System Information Block (SIB): 200 ms Random access + RRC procedure delay: 50 ms Total: 250 ms |
| Re-establishment with respect to an unprepared cell in case of selecting another unprepared cell | Acquisition of SIB: 200 ms Random Access + RRC procedure delay: 50 ms cell selection + NAS recovery: 200 ms Total: 450 ms |

As shown in table 4, connection re-establishment with the prepared cell and connection re-establishment with the unprepared cell may cause different interruption times.

That is, when a target base station acquires context information of a terminal, the target base station is a prepared cell from the point of view of the terminal. The prepared cell does not require a cell selection procedure and an NAS recovery procedure when the terminal performs connection re-establishment after the RLF occurs. Accordingly, the interruption time which may occur during the connection re-establishment may be greatly reduced.

On the other hand, when the target base station to perform the connection re-establishment does not store the context information of the terminal, the target base station is an unprepared cell from the point of view of the terminal. Accordingly, the cell selection procedure and the NAS recovery procedure are required when the terminal performs the connection re-establishment after the RLF occurs. Accordingly, the interruption time which may occur during the connection re-establishment may increase.

Therefore, to reduce the interruption time which is required to perform the connection re-establishment, it is preferable that the target base station acquires the context of the terminal and thus becomes a prepared cell with respect to the terminal. Herein, methods for the target base station to acquire the context information of the terminal are as follows.

First, when the terminal which detects a handover event transmits an MR to the serving base station, the serving base station recognizes that the terminal performs a handover with respect to the target base station, and transmits the context information of the terminal to the target base station. Accordingly, when the serving base station successfully receives the MR from the terminal, the target base station may acquire the context information of the terminal from the serving base station. A process of acquiring the context information by the transmission of the MR will be explained hereinafter with reference to FIG. 4.

Figure 4:
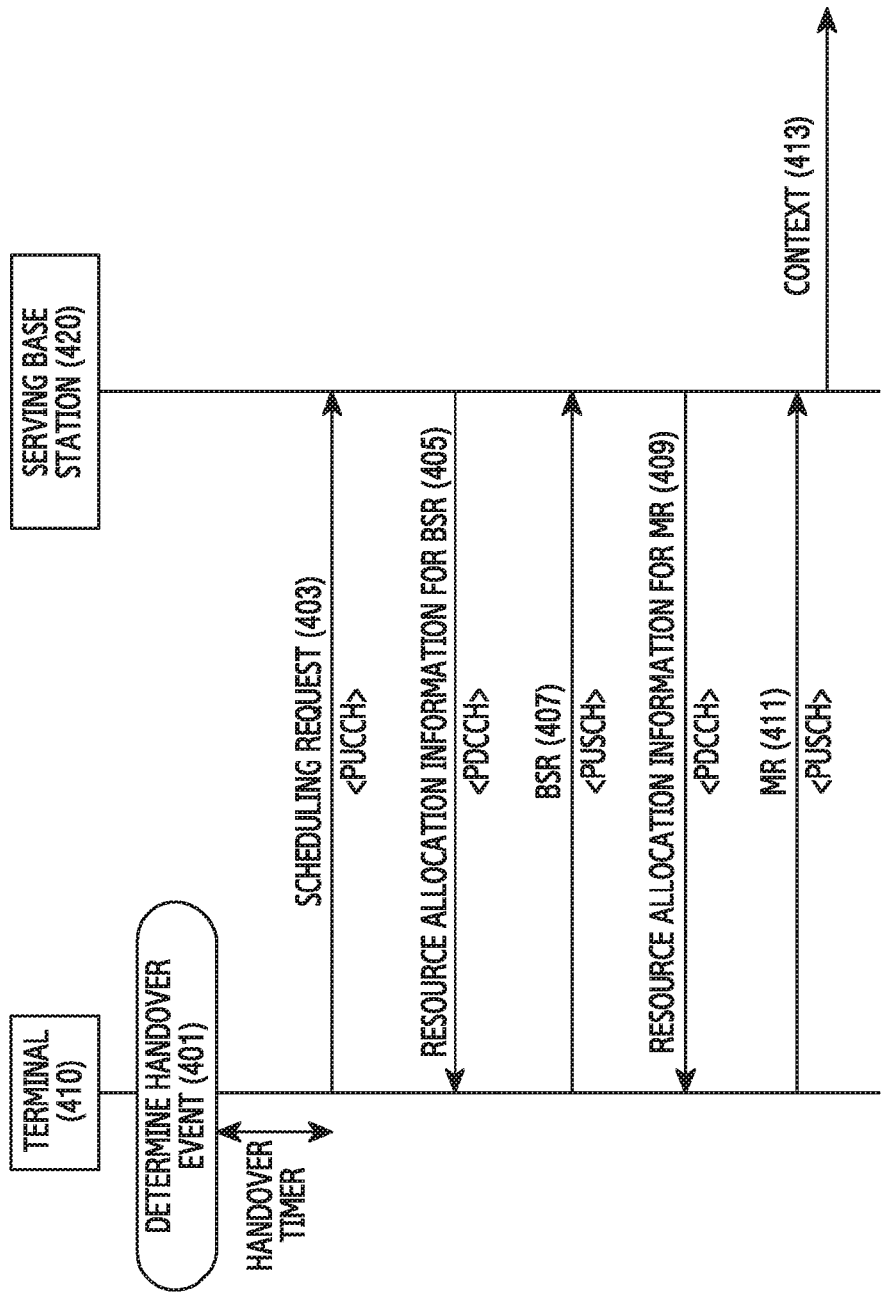
FIG. 4 illustrates signal exchange for transmitting an MR in a mobile communication system according to an exemplary embodiment of the present disclosure.

FIG. 4 illustrates signal exchange for transmitting an MR in a mobile communication system according to an exemplary embodiment of the present disclosure. Referring to FIG. 4, in step 410, a terminal 410 determines whether a handover event occurs or not and the handover event is maintained during the timer TTT. Accordingly, when the terminal 410 transmits a scheduling request through a Physical Uplink Control CHannel (PUCCH) in step 403, a serving base station 420 allocates an uplink resource for transmitting a Buffer Status Report (BSR) through a PDCCH in step 405. Thereafter, in step 407, the terminal 410 transmits the BSR through a Physical Uplink Shared CHannel (PUSCH), and the serving base station 420 which receives the BSR allocates the terminal 410 an uplink resource for transmitting the MR through the PDCCH in step 409. In step 411, the terminal 410 may transmit the MR through the PUSCH. Accordingly, in step 413, the serving base station 420 provides the context of the terminal 410 to a target base station.

Second, the target base station requests the serving base station, a third base station, or an upper node (for example, a Mobility Management Entity (MME)) to transmit the context information of the terminal, and acquires the context of the terminal through an X2 or S1 interface. Hereinafter, the procedure for obtaining the context at the request will be referred to as "context fetch." The process of acquiring the context information according to the context fetch will be explained hereinafter with reference to FIGS. 5 and 6.

Figure 5A:
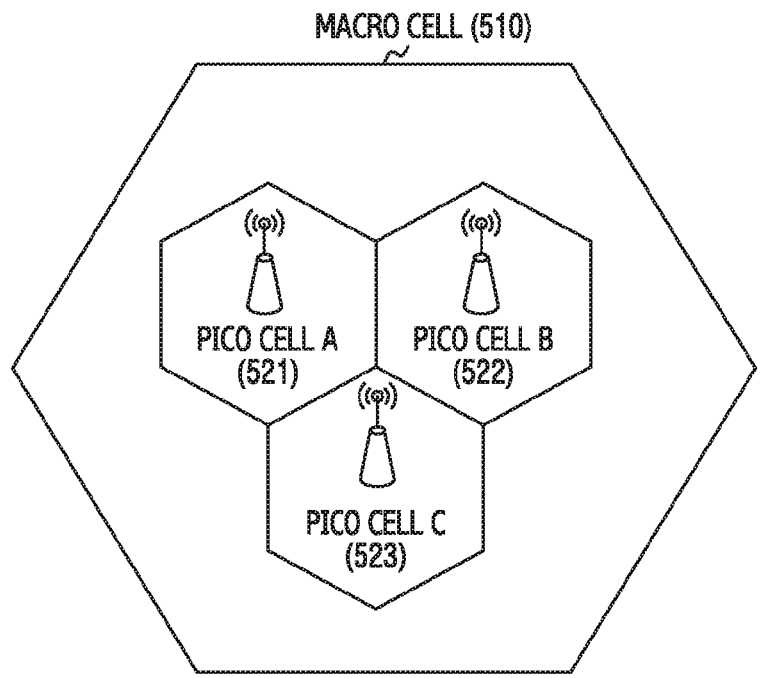
FIG. 5 illustrates an example of a situation in which a context of a terminal is provided to another base station in a mobile communication system according to an exemplary embodiment of the present disclosure.
Figure 5B:
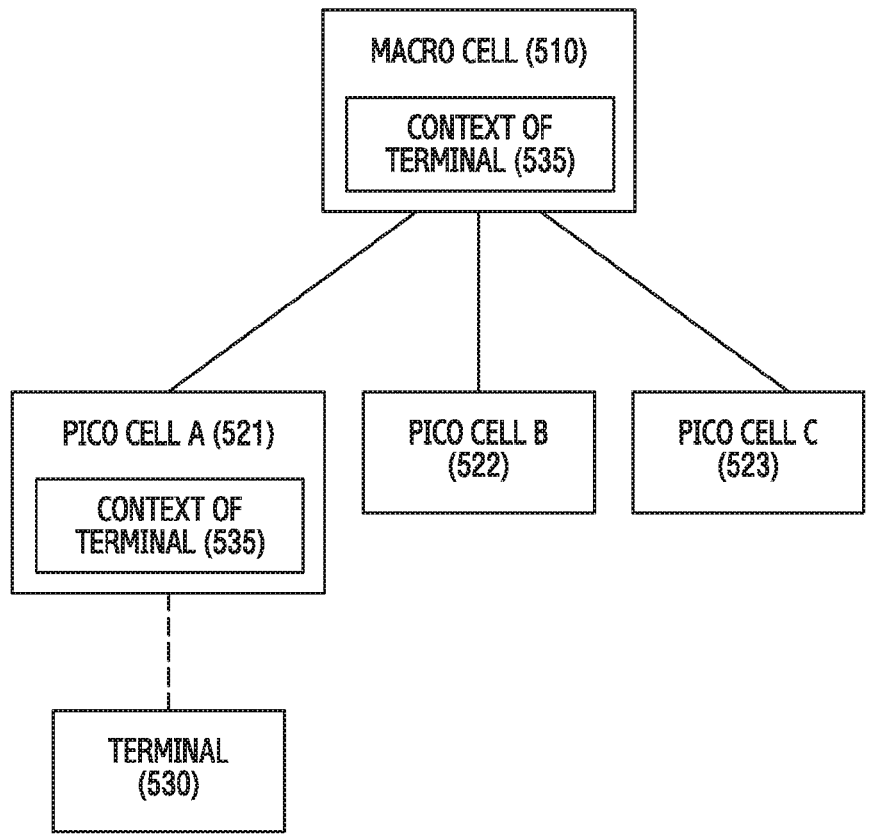

FIG. 5 illustrates an example of a situation in which a context of a terminal is provided to another base station in a mobile communication system according to an exemplary embodiment of the present disclosure. Referring to view (a) of FIG. 5, coverage of a pico cell A 521, coverage of a pico cell B 522, and coverage of a pico cell C 523 are included in coverage of a macro cell 510. The cells shown in view (a) of FIG. 5 have a hierarchical structure as shown in view (b) of FIG. 5. Referring to view (b) of FIG. 5, a terminal 530 is accessing the pico cell A 521. Since the pico cell A 521 is a serving base station of the terminal 530, the pico cell A 521 stores a context 535 of the terminal 530. In addition, the macro cell 510 which is an upper node of the pico cell A 521 also stores the context 535 of the terminal 530. Accordingly, when the terminal 530 moves to the coverage of the pico cell B 522 or the pico cell C 523, the pico cell B 522 or the pico cell C 523 may request the context of the terminal 530 from the macro cell 510 or the pico cell A 521. In other words, the pico cell B 522 or the pico cell C 523 may perform the context fetch with the macro cell 510 or the pico cell A 521.

Figure 6:
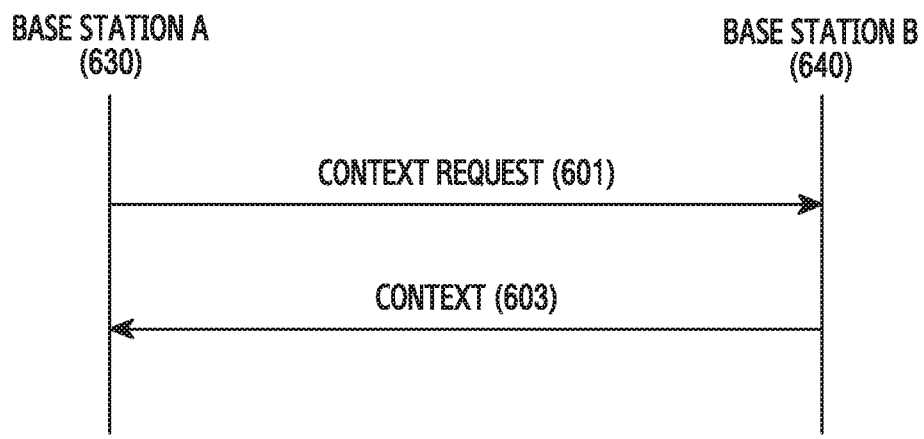
FIG. 6 illustrates signal exchange for context fetch in a mobile communication system according to an exemplary embodiment of the present disclosure.

FIG. 6 illustrates signal exchange for context fetch in a mobile communication system according to an exemplary embodiment of the present disclosure. Referring to FIG. 6, in step 601, a base station A 630 transmits a context request to a base station B 640. The context request includes identification information of a terminal. The base station B 640 may be an upper macro base station of the base station A 630 or another base station. Alternatively, the base station B 640 may be substituted with an upper node (for example, an MME) rather than a base station. Accordingly, the base station B 640 provides the requested context to the base station A 630 in step 603. Since the base station A 630 and the base station B 640 are connected with each other through a backhaul network, signaling between the base station A 630 and the base station B 640 may be performed through a backhaul link rather than a wireless link.

As described above, to reduce the interruption time required to perform the connection re-establishment, the target base station is required to acquire the context of the terminal by the terminal transmitting the MR or the context fetch. Accordingly, when the timer defined for the handover expires first and thus the RLF is declared as shown in FIG. 1, the target base station may acquire the context of the terminal by the terminal transmitting the MR or by performing the context fetch by the target base station itself. In this case, it is preferable to use one of the transmission of the MR or the context fetch that can be completed within a short time.

Referring to FIG. 4, to transmit the MR, signaling such as scheduling request transmission and reception, BSR transmission and reception, resource allocation information transmission and reception, etc. should be successfully performed. When an error occurs during the transmission and reception of the scheduling request, the BSR, and the resource allocation information, the terminal and the serving base station return to their original states and perform corresponding steps again. In addition, a Hybrid Automatic Repeat reQuest (HARQ) technique is applied to the MR. Therefore, when the serving base station fails to receive the MR, the terminal re-transmits the MR. Accordingly, the time required for the serving station to successfully receive the MR may greatly depend on a channel state between the terminal and the serving base station and on whether a message is successfully transmitted and received.

On the other hand, referring to FIG. 6, the context fetch may be performed through the backhaul network and performed in a relatively small number of steps. Accordingly, when it is possible to perform the context fetch, it is more preferable to try to acquire the context by the context fetch prior to transmitting the MR. Accordingly, when the context fetch is preferable and it is possible to perform the context fetch, the terminal may perform the connection re-establishment procedure without transmitting the MR. However, since the MR is transmitted by the terminal and the context fetch is performed by the base station, operation entities are different. Accordingly, there is a need for a method for informing the terminal of whether it is possible to perform the context fetch or not.

Hereinafter, the connection re-establishment with a prepared cell will be referred to as "prepared connection re-establishment" and the connection re-establishment with an unprepared cell will be referred to as "unprepared connection re-establishment."

According to an exemplary embodiment of the present disclosure, a method for controlling an RLF declaring time according to whether the context fetch is supported or not is as follows.

The time to declare the RLF considering the context fetch may be selected as follows. As described above, since the prepared connection re-establishment does not include NAS recovery and cell selection, a relatively short interruption time is required. To perform the prepared connection re-establishment, successful MR transmission and reception or successful context fetch is required. Accordingly, in an environment in which the context fetch is supported, the target base station may be the prepared cell even when the MR is not transmitted and received. On the other hand, in an environment in which the context fetch is not supported, the prepared connection re-establishment may be performed with respect to the target base station only when the serving base station successfully receives the MR from the terminal. However, when a long delay or many errors occur in the process of transmitting and receiving the MR, it is more preferable to abandon the transmission and reception of the MR and perform the unprepared connection re-establishment, in other words, connection establishment.

The mobile communication system according to an exemplary embodiment of the present disclosure supports a procedure in which the serving base station informs the terminal of whether the context fetch is supported or not. To achieve this, the serving base station transmits an indicator informing whether the context fetch is supported or not to the terminal. For example, the indicator may be 1 bit long. Hereinafter, the indicator informing whether the context fetch is supported or not will be referred to as a "Context Fetch Indicator (CFI)."

The base station which transmits the CFI may determine the value of the CFI considering a management status of the context regarding the terminal which accesses the base station. For example, the base station may ask other adjacent base stations or an MME whether they store the context of the terminal, whether they will maintain the context, or whether they can transmit the context within a predetermined delay time in response to a context request. When there exist other adjacent base stations or an MME satisfying all of the above-described conditions as a result of asking, the base station may set the CFI to a value informing that the context fetch is supported.

When the value of the CFI is a positive value (for example, 1), the terminal which receives the CFI may recognize that the context fetch is supported. Accordingly, when the handover timer expires first while the RLF timer is in progress, the terminal may perform the connection re-establishment without transmitting the MR. When the CFI has the positive value, the connection re-establishment may be performed as shown in FIG. 7.

Figure 7:
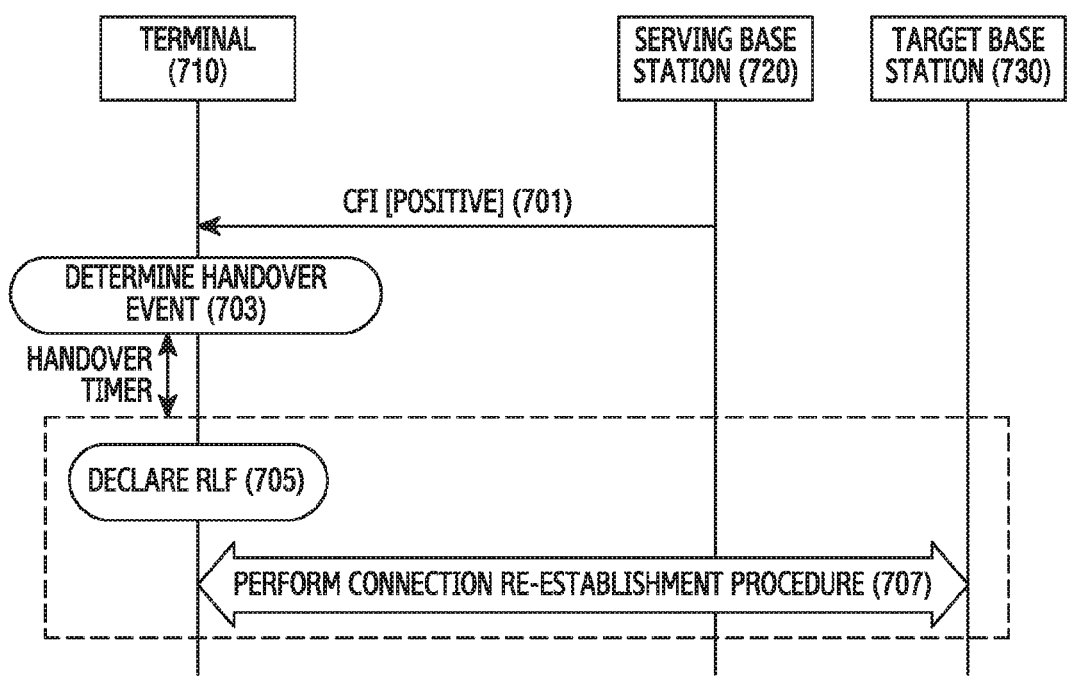
FIG. 7 illustrates showing signal exchange for a connection re-establishment procedure according to whether context fetch is supported in a mobile communication system according to an exemplary embodiment of the present disclosure.

FIG. 7 illustrates signal exchange for a connection re-establishment procedure according to whether context fetch is supported or not in a mobile communication system according to an exemplary embodiment of the present disclosure.

Referring to FIG. 7, a serving base station 720 transmits a CFI which is set to be a positive value to a terminal 710 in step 701. The CFI may be transmitted not only to the terminal 710 but also to a plurality of terminals. For example, the serving base station 720 may transmit the CFI through a Broadcast CHannel (BCH). For example, the CFI may be included in an SIB. Accordingly, the terminal 710 may recognize that base stations within a predetermined range to which the serving base station 720 belongs support the context fetch.

In step 703, the terminal 710 determines whether a handover event occurs or not. For example, the terminal 710 may determine that received power for the serving base station 720 is smaller than a target value of received power and a difference between the received power for the serving base station 720 and the target value of the received power is greater than a threshold value. In the exemplary embodiment shown in FIG. 7, the handover event is maintained during a handover timer. In this case, at the time when the handover timer expires, an RLF timer is in progress although not shown in FIG. 7.

In step 705, the terminal 710 declares the REF. That is, since the RLF timer does not yet expire but the handover timer expires first, the terminal 710 terminates the RLF timer. In this case, since the terminal 710 recognizes that a target base station 730 supports the context fetch through the CFI, the terminal 710 declares the RLF without attempting to transmit an MR.

In step 707, the terminal 710 which declares the RLF performs a connection re-establishment procedure with respect to the target base station 730. For example, the terminal 710 is allocated an uplink resource through a random access procedure and then transmits the connection re-establishment request message to the target base station 730. The connection re-establishment request message may include at least one of a Radio Network Temporary Identity (RNTI), a physical cell IDentifier (ID), a Message Authentication Code for Integrity (MAC-I) for a security algorithm, and a reason why the connection re-establishment is performed. Accordingly, the target base station 730 transmits a connection re-establishment message to the terminal 710. The connection re-establishment message may include at least one of radio resource configuration information and next hop chaining count.

Although not shown in FIG. 7, the target base station 730 acquires the context of the terminal 710 through the context fetch. For example, the target base station 730 may acquire the context of the terminal 710 from the serving base station 730, another base station, an upper macro base station, or an MME.

When the value of the CFI is a negative value (for example, 0), the terminal which receives the CFI may recognize that the context fetch is not supported. Accordingly, when the handover timer expires first while the RLF timer is in progress, the terminal transmits the MR such that the target base station becomes a prepared cell. When the CFI has a negative value, the connection re-establishment may be performed as shown in FIG. 8.

Figure 8:
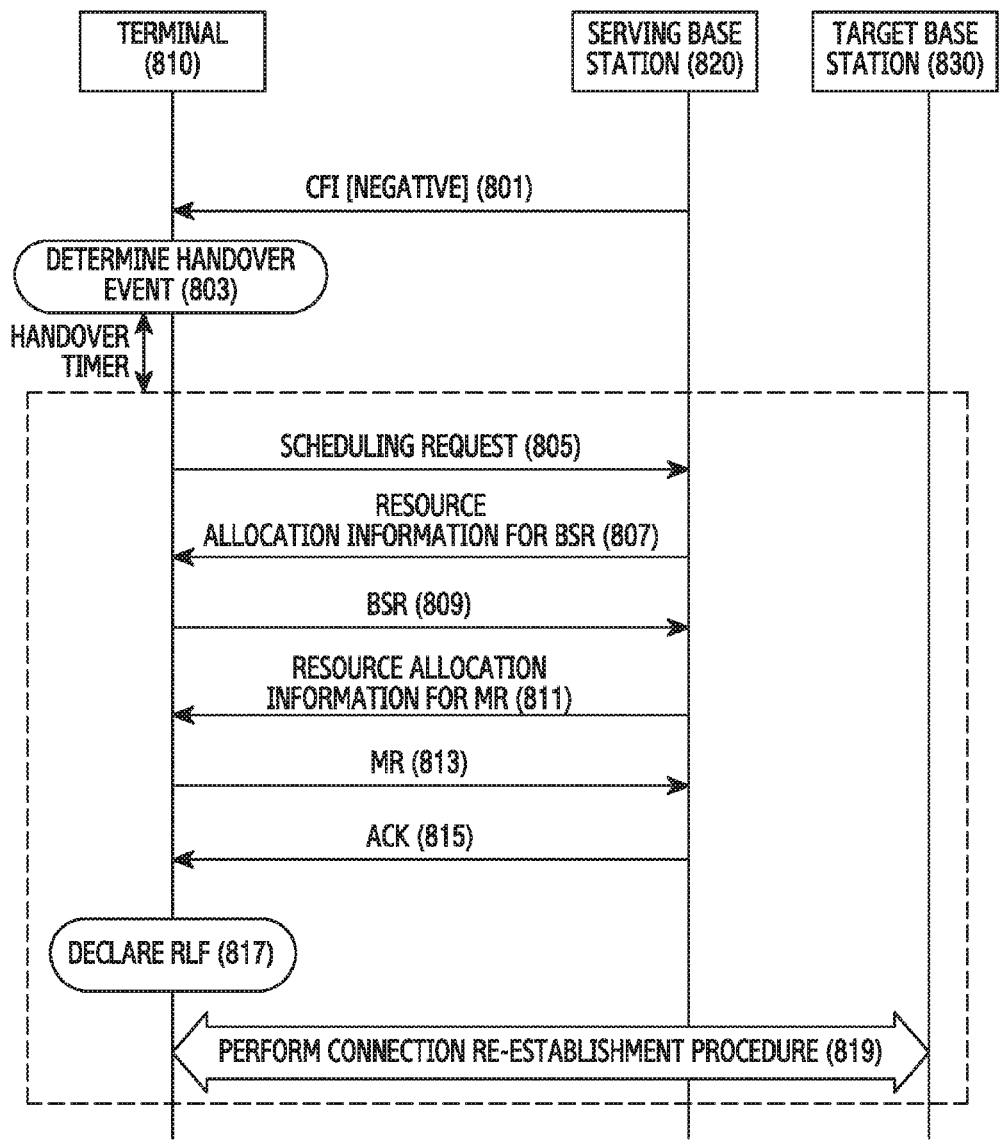
FIG. 8 illustrates signal exchange for a connection re-establishment procedure according to whether context fetch is supported in a mobile communication system according to another exemplary embodiment of the present disclosure.

FIG. 8 illustrates signal exchange for a connection re-establishment procedure according to whether context fetch is supported or not in a mobile communication system according to another exemplary embodiment of the present disclosure.

Referring to FIG. 8, in step 801, a serving base station 820 transmits a CFI which is set to be a negative value to a terminal 810. The CFI may be transmitted not only to the terminal 810 but also to a plurality of terminals. For example, the serving base station 820 may transmit the CFI through a BCH. For example, the CFI may be included in an SIB. Accordingly, the terminal 810 may recognize that base stations within a predetermined range to which the serving base station 820 belongs do not support context fetch.

In step 803, the terminal 810 determines whether a handover event occurs or not. For example, the terminal 810 may determine that received power for the serving base station 820 is smaller than a target value of received power and a difference between the received power for the serving base station 820 and the target value of the received power is greater than a threshold value. In the exemplary embodiment shown in FIG. 8, the handover event is maintained during a handover timer. In this case, at the time when the handover timer expires, an RLF timer is in progress although not shown in FIG. 8.

In step 805, the terminal 810 transmits a scheduling request to the serving base station 820. The transmission of the scheduling request may be a part of a procedure for transmitting an MR. The terminal 810 may transmit the scheduling request through an uplink control channel allocated to the terminal 810. For example, the scheduling request may be transmitted through a PUCCH.

In step 807, the serving base station 820 transmits resource allocation information for a BSR. Since the size of an uplink resource necessary for the terminal 810 is determined through the BSR, the serving base station 820 allocates a resource for transmitting the BSR. The resource allocation information may be transmitted through a PDCCH.

In step 809, the terminal 810 transmits the BSR. The BSR is information informing a buffer state of the terminal 810. The terminal 810 may inform the size of the uplink resource necessary for the terminal 810 by transmitting the BSR. The BSR may be transmitted through a PUSCH.

In step 811, the serving base station 820 transmits resource allocation information for an MR. That is, the serving base station 820 allocates a resource for transmitting the MR. The resource allocation information may be transmitted through the PDCCH.

In step 813, the terminal 810 transmits the MR. The MR includes information indicating a target base station 830 and information indicating channel quality with the target base station 830. An HARQ technique is applied to the MR. The MR may be transmitted through the PUSCH. In the exemplary embodiment of FIG. 8, the serving base station 820 successfully receives the MR.

In step 815, the serving base station 820 transmits an acknowledgement (ACK). In other words, the serving base station 820 successfully receives the MR and transmits the ACK to inform that the MR has been successfully received. Accordingly, the terminal 810 may recognize that the MR has been successfully received. In this case, the serving base station 820 provides the context of the terminal 810 to the target base station 830 although not shown in FIG. 8.

In step 817, the terminal 810 declares an RLF. That is, since the MR has been successfully transmitted, the terminal 810 declares the RLF to perform a connection re-establishment procedure.

In step 819, the terminal 810 which declares the RLF performs the connection re-establishment procedure with the target base station 830. In this case, the target base station 830 may perform the connection re-establishment procedure using the context of the terminal 810 provided by the serving base station 820. For example, the terminal 810 is allocated an uplink resource through a random access procedure, and then, transmits the connection re-establishment request message to the target base station 830. The connection re-establishment request message may include at least one of an RNTI, a physical cell ID, a MAC-I for a security algorithm, and a reason why the connection re-establishment is performed. Accordingly, the target base station 830 transmits a connection re-establishment message to the terminal 810. The connection re-establishment message may include at least one of radio resource configuration information and next hop chaining count.

When an error or re-transmission occurs in the series of procedures for transmitting and receiving the MR as shown in FIG. 8, the serving base station and the terminal return to their original states and repeat the corresponding processes. Accordingly, although the CFI indicates that the context fetch is not supported, the terminal may stop the procedure for transmitting and receiving the MR, declare the RLF, and then perform the unprepared connection re-establishment as long as a predefined condition is satisfied. For example, the predefined condition may include at least one of the conditions shown in table 5 presented below:

TABLE 5

| Conditions | Details |
| --- | --- |
| Condition 1 | Average channel quality < threshold 1 |
| Condition 2 | Number of times of reception errors > threshold 2 |
| Condition 3 | Timer > threshold 3 |

In table 5, the number of times of reception errors which is a determination index of condition 2 may be counted with respect to at least one of a scheduling request transmitted and received in the MR transmission and reception procedure, a BSR, a PDCCH block, and an HARQ Non-Acknowledge (NACK).

The above-described exemplary embodiments are exemplary embodiment of a case in which the serving base station and the target base station are included in an unit area where the context fetch is applied. For example, a case in which a plurality of pico cells are included in coverage of a macro cell, and the macro cell stores all of the contexts of macro cell terminals and pico cell terminals included in the coverage of the macro cell, and the terminal experiences an RLF in a serving pico cell and then performs connection re-establishment with respect to an adjacent target pico cell is considered. Herein, the serving pico cell knows that at least one adjacent pico cell can acquire context information of the terminal from the macro cell, and accordingly, the serving pico cell may inform the terminal that the target pico cell can acquire the context information of the terminal through the context fetch.

However, there may be different situations from the above-described exemplary embodiments. For example, a specific base station may not support the context fetch for various reasons such as tightened security, absence of a backhaul link, etc. Accordingly, it is necessary to inform whether the context fetch is supported or not with reference to an entity which performs the context fetch, that is, a target cell of connection re-establishment. In this case, the terminal must know whether the target cell supports the context fetch or not prior to declaring the RLF. This is because, when the target cell supports the context fetch, the terminal will perform the connection re-establishment with respect to the target cell without a further wait after the handover timer expires. Accordingly, the mobile communication system according to another exemplary embodiment of the present disclosure may inform whether the context fetch is supported or not as follows.

According to an exemplary embodiment of the present disclosure, a serving base station may inform whether the context fetch is supported in at least one adjacent base station or not. For example, the serving base station may broadcast a Physical Cell Identity (PCID) of an adjacent cell and information, paired with the PCID, indicating whether the context fetch is supported or not to at least one terminal which accesses the serving base station. That is, the information may include the PCID of the at least one adjacent base station and a CFI corresponding to the PCID. A procedure in which the serving base station informs whether at least one adjacent base station supports the context fetch or not may be performed as shown in FIG. 9 explained below.

Figure 9:
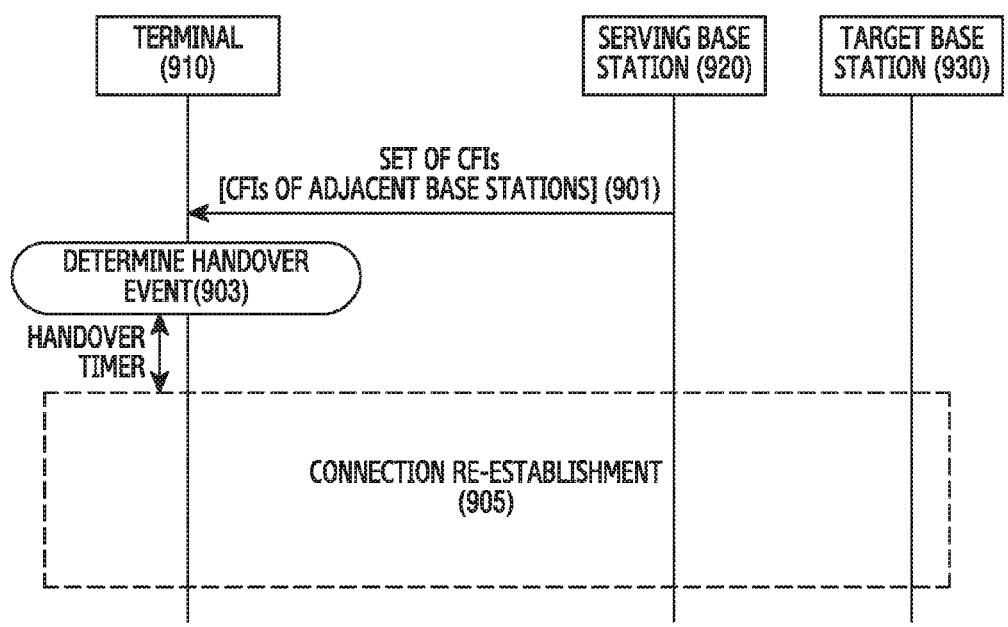
FIG. 9 illustrates signal exchange for a connection re-establishment procedure according to whether context fetch is supported in a mobile communication system according to another exemplary embodiment of the present disclosure.

FIG. 9 illustrates signal exchange for a connection re-establishment procedure according to whether context fetch is supported or not in a mobile communication system according to another exemplary embodiment of the present disclosure.

Referring to FIG. 9, in step 901, a serving base station 920 transmits a set of CFIs to a terminal 910. The set of CFIs includes CFIs regarding adjacent base stations. In the set of CFIs, the adjacent base stations are identified by PCIDs. For example, the serving base station 920 may transmit the set of CFIs through a BCH. For example, the set of CFIs may be included in an SIB. Accordingly, the terminal 910 may recognize that the adjacent base stations of the serving base station 920 supports the context fetch.

In step 903, the terminal 910 determines whether a handover event occurs or not. For example, the terminal 910 determines that received power for the serving base station 920 is smaller than a target value of received power and a difference between the received power for the serving base station 920 and the target value of the received power is greater than a threshold value. In the exemplary embodiment shown in FIG. 9, the handover event is maintained during a handover timer. In this case, at the time when the handover timer expires, an RLF timer is in progress although not shown in FIG. 9.

In step 905, the terminal 910 performs procedures necessary for the connection re-establishment with a target base station 930. In this case, the terminal 910 determines whether the target base station 930 supports the context fetch or not based on the set of CFIs received in step 901, and determines whether to transmit an MR according to whether the context fetch is supported or not. Accordingly, as in steps 705 and 707 of FIG. 7 or steps 805 to 819 of FIG. 8, the terminal 910 may perform the connection re-establishment.

According to an exemplary embodiment of the present disclosure, a target base station may inform whether the target base station supports the context fetch. For example, the target base station may include information indicating whether the target base station supports the context fetch in an SIB. Accordingly, while the RLF timer is in progress, a terminal receives an SIB of at least one adjacent base station having a high intensity of signal in addition to from a serving base station, and determines whether the corresponding adjacent base station supports the context fetch through the SIB of the adjacent base station. A procedure in which the target base station informs whether the target base station supports the context fetch or not may be performed as shown in FIG. 10 explained below.

Figure 10:
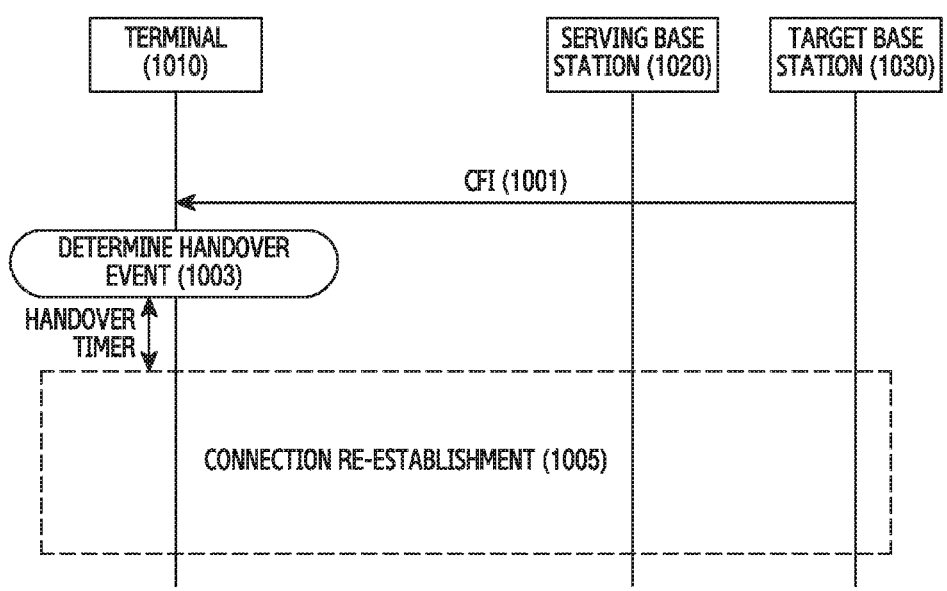
FIG. 10 illustrates signal exchange for a connection re-establishment procedure according to whether context fetch is supported in a mobile communication system according to another exemplary embodiment of the present disclosure.

FIG. 10 illustrates signal exchange for a connection re-establishment procedure according to whether context fetch is supported or not in a mobile communication system according to another exemplary embodiment of the present disclosure.

Referring to FIG. 10, in step 1001, a target base station 1030 transmits a CFI to a terminal 1010. The CFI indicates whether the target base station 1030 supports context fetch or not. For example, the target base station 1030 may transmit the set of CFIs through a BCH. For example, the CFI may be included in an SIB of the target base station 1030. Accordingly, the terminal 1010 may recognize that the target base station 1030 supports the context fetch. In this case, the terminal 1010 receives the CFI through the SIB of the target base station 1030 while the RLF timer is in progress.

In step 1003, the terminal 1010 determines whether a handover event occurs or not. For example, the terminal 1010 may determine that received power for the serving base station 1020 is smaller than a target value of received power and a difference between the received power for the serving base station 1020 and the target value of the received power is greater than a threshold value. In the exemplary embodiment shown in FIG. 10, the handover event is maintained during a handover timer. In this case, at the time when the handover timer expires, an RLF timer is in progress although not shown in FIG. 10.

In step 1005, the terminal 1010 performs procedures necessary for the connection re-establishment with the target base station 1030. In this case, the terminal 1010 determines whether the target base station 1030 supports the context fetch or not based on the set of CFIs received in step 1001, and determines whether to transmit an MR according to whether the context fetch is supported or not. Accordingly, as in steps 705 and 707 of FIG. 7 or steps 805 to 819 of FIG. 8, the terminal 1010 may perform the connection re-establishment.

According to an exemplary embodiment of the present disclosure, an overlaid macro cell may inform whether the context fetch is supported or not in at least one pico cell. In other words, when the coverage of the at least one pico cell is included in the coverage of the macro cell, the macro base station may inform whether each of the at least one pico base station supports the context fetch or not. In this case, when the pico base station performs the context fetch, the pico cell may request context information of a terminal from the macro base station. Accordingly, the macro base station may broadcast information indicating which pico base station supports the context fetch or which pico base station does not support the context fetch to terminals which access the macro base station. For example, the macro base station may indicate whether each of the pico base stations supports the context fetch or not, indicate a pico base station which supports the context fetch, or a pico base station which does not support the context fetch. A procedure in which the macro base station informs whether at least one pico base station supports context fetch or not may be performed as shown in FIG. 11 explained below.

Figure 11:
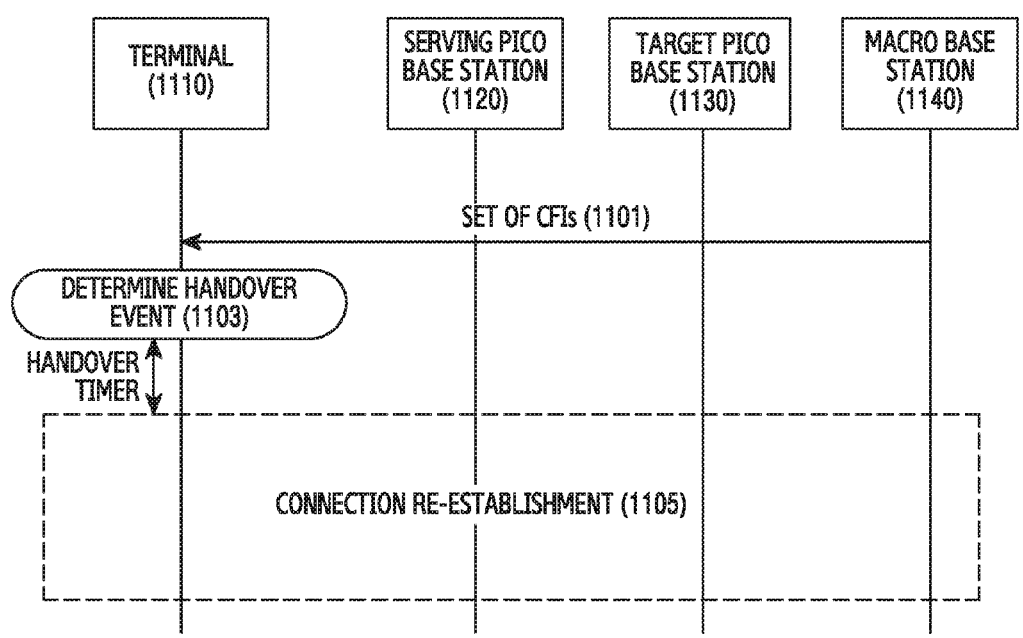
FIG. 11 illustrates signal exchange for a connection re-establishment procedure according to whether context fetch is supported in a mobile communication system according to another exemplary embodiment of the present disclosure.

FIG. 11 illustrates signal exchange for a connection re-establishment procedure according to whether context fetch is supported or not in a mobile communication system according to another exemplary embodiment of the present disclosure.

Referring to FIG. 11, in step 1101, a macro base station 1140 transmits a set of CFIs to a terminal 1110. The set of CFIs may include at least one of the CFIs of subordinate pico base stations (for example, a serving pico base station 1120, a target pico base station 1130) of the macro base station 1140. In the set of CFIs, the pico base stations may be identified by PCIDs. For example, the macro base station 1140 may transmit the set of CFIs through a BCH. For example, the set of CFIs may be included in an SIB. Accordingly, the terminal 1110 may recognize that the subordinate pico base stations (for example, the serving pico base station 1120, the target pico base station 1130) of the macro base station 1140 support the context fetch.

In step 1103, the terminal 1110 which is connecting to the serving pico base station 1120 determines whether a handover event occurs or not. For example, the terminal 1110 may determine that received power for the serving pico base station 1120 is smaller than a target value of received power and a difference between the received power for the serving pico base station 1120 and the target value of the received power is greater than a threshold value. In the exemplary embodiment shown in FIG. 11, the handover event is maintained during a handover timer. In this case, at the time when the handover timer expires, an RLF timer is in progress although not shown in FIG. 11.

In step 1105, the terminal 1110 performs procedures necessary for the connection re-establishment with the target pico base station 1130. In this case, the terminal 1110 determines whether the target base station 1130 supports the context fetch or not based on the set of CFIs received in step 1101, and determines whether to transmit an MR according to whether the context fetch is supported or not. Accordingly, as in steps 705 and 707 of FIG. 7 or steps 805 to 819 of FIG. 8, the terminal 1110 may perform the connection re-establishment.

As described above, the terminal may recognize whether the target base station supports the context fetch or not through the CFI, etc. Accordingly, the terminal may determine whether to transmit the MR after the handover timer expires. When it is recognized that the target base station does not support the context fetch through the CFI, etc., the terminal transmits the MR.

However, since the ongoing RLF timer means that channel quality between the terminal and the serving base station is poor, the terminal is less likely to successfully receive a PDCCH including uplink resource allocation information while the RFL timer is in progress. Accordingly, when the terminal is able to transmit the MR without receiving the uplink resource allocation information from the serving base station, it is highly likely that the terminal performs prepared connection re-establishment. According to an exemplary embodiment of the present disclosure, to achieve this, the serving base station reserves a time-frequency resource for the MR of the terminal in advance, and broadcasts information on the reserved resource to terminals which access a cell. Herein, the reserved resource is not allocated to a specific terminal but is used through contention of the terminals which access the serving cell or used through a request and response procedure.

Accordingly, in the mobile communication system according to an exemplary embodiment of the present disclosure, the base station transmits information indicating a rule of using the reserved resource. Hereinafter, the information indicating the rule of using the reserved resource will be referred to as "a reserved resource for MR indicator" or "a reserved resource indicator" for convenience of explanation. The reserved resource indicator is information which is provided to the terminals by the serving base station. When the reserved resource indicator is a first value (for example, 0), the terminals which access the serving cell are able to transmit the MR through contention in the reserved resource. When the reserved resource indicator is a second value (for example, 1), the terminals which access the serving cell transmit a request for the reserved resource and only the terminal which receives a response to the request is able to transmit the MR through the reserved resource.

A case in which the reserved resource is used based on contention is as follows.

The serving base station provides allocation information regarding the reserved resource to the terminal, and the terminal which experiences the RLF tries to transmit the MR through the reserved resource. In this case, only the terminal which proceeds with the RLF timer has the authority to access the reserved resource, and at least one terminal which proceeds with the RLF timer tries to transmit the MR based on contention. In this case, the serving base station provides at least one parameter related to the contention to the terminal. For example, the at least one parameter related to the contention may include a minimum access period, transmission power setting, etc.

Figure 12:
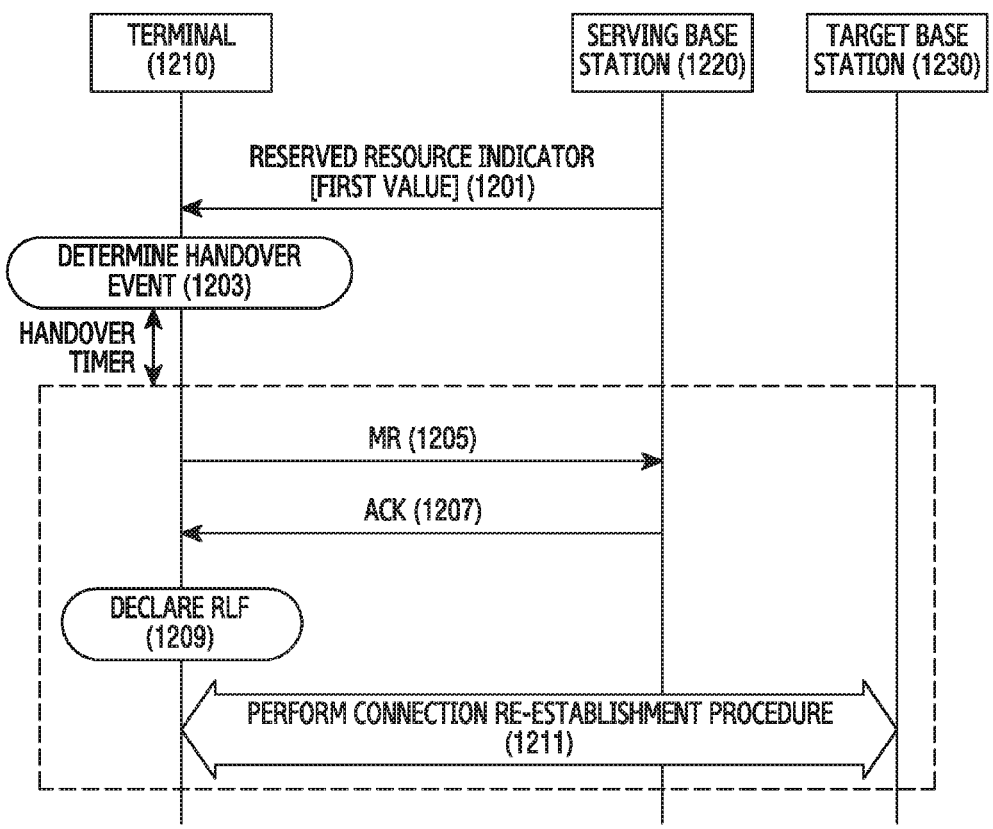
FIG. 12 illustrates signal exchange for transmitting an MR in a mobile communication system according to an exemplary embodiment of the present disclosure.

FIG. 12 illustrates signal exchange for transmitting an MR in a mobile communication system according to an exemplary embodiment of the present disclosure. FIG. 12 illustrates an example of a case in which a target base station 1230 does not support context fetch.

Referring to FIG. 12, in step 1201, a serving base station 1220 transmits a reserved resource indicator to a terminal 1210. The reserved resource indicator indicates a rule of using a resource reserved to transmit an MR. In the exemplary embodiment of FIG. 12, the reserved resource indicator is set to a first value indicating a contention method. Although not shown in FIG. 12, resource allocation information informing the size and location of the reserved resource may further be transmitted. For example, the serving base station 1220 may transmit at least one of the reserved resource indicator and the resource allocation information through a BCH. For example, at least one of the reserved resource indicator and the resource allocation information may be included in an SIB.

In step 1203, the terminal 1210 determines whether a handover event occurs or not. For example, the terminal 1210 may determine that received power for the serving base station 1220 is smaller than a target value of received power and a difference between the received power for the serving base station 1220 and the target value of the received power is greater than a threshold value. In the exemplary embodiment shown in FIG. 12, the handover event is maintained during a handover timer. In this case, at the time when the handover timer expires, an RLF timer is in progress although not shown in FIG. 12.

In step 1205, the terminal 1210 transmits an MR to the serving base station 1220 through the reserved resource. In the exemplary embodiment shown in FIG. 12, since there exists the reserved resource for the MR, steps such as transmitting a scheduling request, etc. are not performed unlike in FIG. 8. Accordingly, time required to transmit the MR can be reduced.

In step 1207, the serving base station 1220 transmits an ACK. In other words, the serving base station 1220 successfully receives the MR and transmits the ACK informing that the MR has been successfully received. Accordingly, the terminal 1210 may recognize that the MR has been successfully transmitted. In this case, although not shown in FIG. 12, the serving base station 1220 provides a context of the terminal 1210 to the target base station 1230.

In step 1209, the terminal 1210 declares an RLF. That is, since the MR has been successfully transmitted, the terminal 1210 declares the RLF to perform a connection re-establishment procedure.

In step 1211, the terminal 1210 which declares the RLF performs the connection re-establishment procedure with the target base station 1230. The target base station 1230 may perform the connection re-establishment procedure using the context of the terminal 1210 provided by the serving base station 1220.

As described above, the terminal may transmit the MR using the reserved resource. However, since the use of the reserved resource does not guarantee that the terminal never fails to transmit the MR, unprepared connection re-establishment may be performed according to a predefined condition. Specifically, when the predefined condition is satisfied, the terminal stops the procedure for transmitting and receiving the MR, declares the RLF and then performs unprepared connection re-establishment. For example, the predefined condition may include at least one of the conditions shown in table 6 presented below:

TABLE 6

| Conditions | Details |
| --- | --- |
| Condition 1 | Average channel quality < threshold 1 |
| Condition 2 | Number of times of reception errors > threshold 2 |
| Condition 3 | Timer > Threshold 3 |

In table 6, the number of times of reception errors which is a determination index of condition 2 may be counted with respect to at least one of a contention failure and an HARQ NACK.

A case in which the reserved resource is used by a request and a response is as follows.

A serving base station provides information regarding a reserved resource to a terminal, and the terminal which experiences an RLF transmits a request signal to the serving base station to use the reserved resource. Hereinafter, the request signal will be referred to as a "reserved resource access request" for convenience of explanation.

According to an exemplary embodiment of the present disclosure, the terminal may transmit a random access signal which is resistant to an error as the reserved resource access request. Since an error rate of the random access signal is set to be relatively lower than other messages, the serving base station is highly likely to receive the reserved resource access request. Accordingly, the terminal may receive a response message from the serving base station or may transmit the MR without receiving the response message. In this case, when the response message is omitted, the terminal may transmit the MR through the reserved resource after a predetermined number of frames pass.

The serving base station may be free to allocate the reserved resource for other purposes prior to receiving the reserved resource access request. However, when the reserved resource access request is received, the serving base station allocates the reserved resource to receive the MR. In other words, the serving base station does not allocate the reserved resource for other purposes. That is, the serving base station empties the reserved resource. In this case, to inform that the reserved resource is emptied, the serving base station may transmit the response message.

Figure 13:
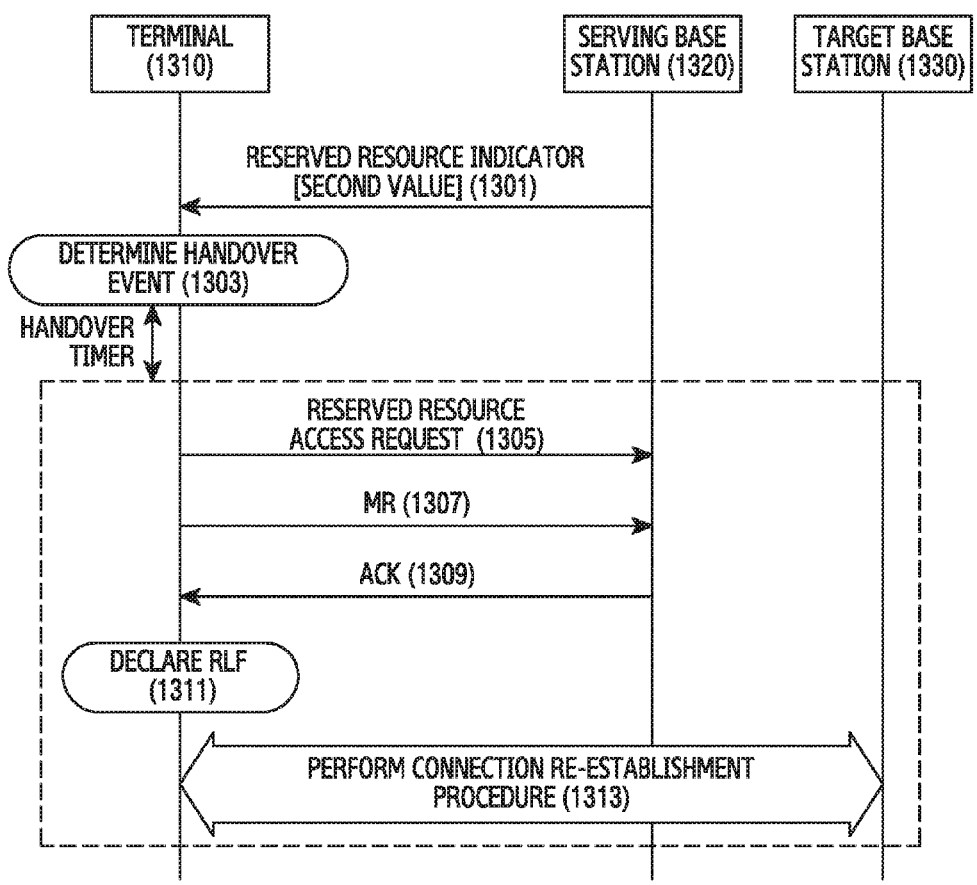
FIG. 13 illustrates signal exchange for transmitting an MR in a mobile communication system according to another exemplary embodiment of the present disclosure.

FIG. 13 illustrates signal exchange for transmitting an MR in a mobile communication system according to another exemplary embodiment of the present disclosure. FIG. 13 illustrates an example of a case in which a target base station 1330 does not support context fetch.

Referring to FIG. 13, in step 1301, a serving base station 1320 transmits a reserved resource indicator to a terminal 1310. The reserved resource indicator indicates a rule of using a resource reserved to transmit an MR. In the exemplary embodiment of FIG. 13, the reserved resource indicator is set to a second value indicating a request and respond method. Although not shown in FIG. 13, resource allocation information informing the size and location of the reserved resource may further be transmitted. In addition, although not shown in FIG. 13, random access code allocation information allocated to request the use of the reserved resource may further be transmitted. For example, the serving base station 1320 may transmit at least one of the reserved resource indicator, the resource allocation information, and the random access code allocation information through a BCH. For example, at least one of the reserved resource indicator, the resource allocation information, and the random access code allocation information may be included in an SIB.

In step 1303, the terminal 1310 determines whether a handover event occurs or not. For example, the terminal 1310 may determine that received power for the serving base station 1320 is smaller than a target value of received power and a difference between the received power for the serving base station 1320 and the target value of the received power is greater than a threshold value. In the exemplary embodiment shown in FIG. 13, the handover event is maintained during a handover timer. In this case, at the time when the handover timer expires, an RLF timer is in progress although not shown in FIG. 13.

In step 1305, the terminal 1310 transmits a reserved resource access request to the serving base station 1320. The reserved resource access request is a signal which requests not to allocate the reserved resource for other purposes. The reserved resource access request may have a format of a random access signal. Although not shown in FIG. 13, the terminal 1310 may further receive a response message to the reserved resource access request according to another exemplary embodiment of the present disclosure.

In step 1307, the terminal 1310 transmits an MR to the serving base station 1320 through the reserved resource. When the response message is omitted, the terminal 1310 may transmit the MR after a predetermined number of frames pass after transmitting the reserved resource access request. According to another exemplary embodiment of the present disclosure, when the response message is used, the terminal 1310 may receive the response message, and then, transmit the MR when the terminal 1310 is allowed to transmit the MR by the response message. In the exemplary embodiment of FIG. 13, there exists the reserved resource for the MR, and thus steps such as transmitting a scheduling request, etc. are not performed unlike in FIG. 8. Accordingly, time required to transmit the MR can be reduced.

In step 1309, the serving base station 1320 transmits an ACK. In other words, the serving base station 1320 successfully receives the MR and transmits the ACK informing that the MR has been successfully received. Accordingly, the terminal 1310 may recognize that the MR has been successfully transmitted. In this case, although not shown in FIG. 13, the serving base station 1320 provides a context of the terminal 1310 to the target base station 1330.

In step 1311, the terminal 1310 declares the RLF. That is, since the MR has been successfully transmitted, the terminal 1310 declares the RLF to perform the connection re-establishment procedure.

In step 1313, the terminal 1310 which declares the RLF performs the connection re-establishment procedure with the target base station 1330. The target base station 1330 may perform the connection re-establishment procedure using the context of the terminal 1310 provided by the serving base station 1320.

As described above, the terminal may transmit the MR using the reserved resource. However, since the use of the reserved resource does not guarantee that the terminal never fails to transmit the MR, unprepared connection re-establishment may be performed according to a predefined condition. Specifically, when the predefined condition is satisfied, the terminal stops the procedure for transmitting and receiving the MR, declares an RLF and then performs unprepared connection re-establishment. For example, the predefined condition may include at least one of the conditions shown in table 7 presented below:

TABLE 7

| Conditions | Details |
| --- | --- |
| Condition 1 | Average channel quality < threshold 1 |
| Condition 2 | Number of times of reception errors > threshold 2 |
| Condition 3 | Timer > Threshold 3 |

In table 7, the number of times of reception errors which is a determination index of condition 2 may be counted with respect to at least one of a random access failure and an HARQ NACK.

Figure 14:
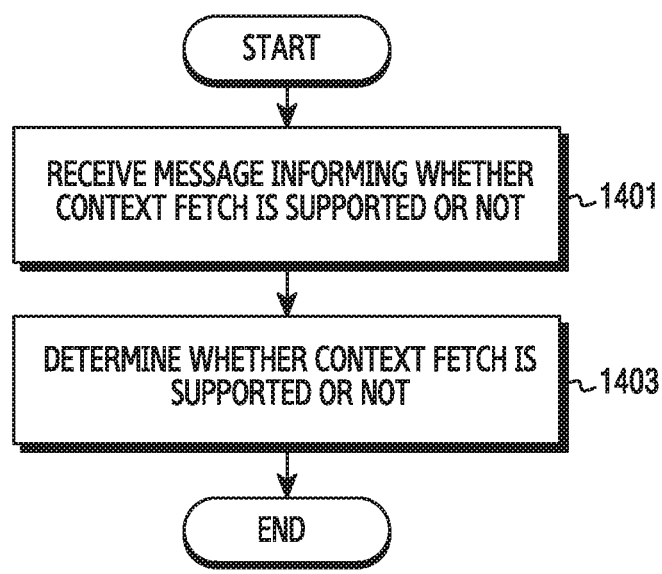
FIG. 14 illustrates an operation procedure of a terminal in a mobile communication system according to an exemplary embodiment of the present disclosure.

FIG. 14 illustrates an operation procedure of a terminal in a mobile communication system according to an exemplary embodiment of the present disclosure.

Referring to FIG. 14, the terminal receives a message informing whether context fetch is supported or not from a base station in step 1401. The message may indicate at least one of whether the base station supports the context fetch or not, whether base stations included in an unit area where the context fetch is applied and the base station belongs support the context fetch or not, whether at least one adjacent base station of the base station supports the context fetch or not, and whether subordinate pico base stations having coverage overlaid with the base station support the context fetch or not. For example, when the message indicates whether a plurality of base stations support the context fetch or not, the message may include identification information of each of the base stations and an indicator corresponding to each of the base stations. In addition, when the message indicates whether a plurality of base stations support the context fetch or not, the message may indicate only at least one base station which supports the context fetch or indicate only at least one base station which does not support the context fetch. The message may be broadcasted through a BCH.

After receiving the message indicating whether the context fetch is supported or not, the terminal proceeds to step 1403 to determine whether the context fetch is supported in the base station or at least one other base station based on the message. That is, the terminal may determine whether at least one base station supports the context fetch by receiving and decoding the message.

Figure 15:
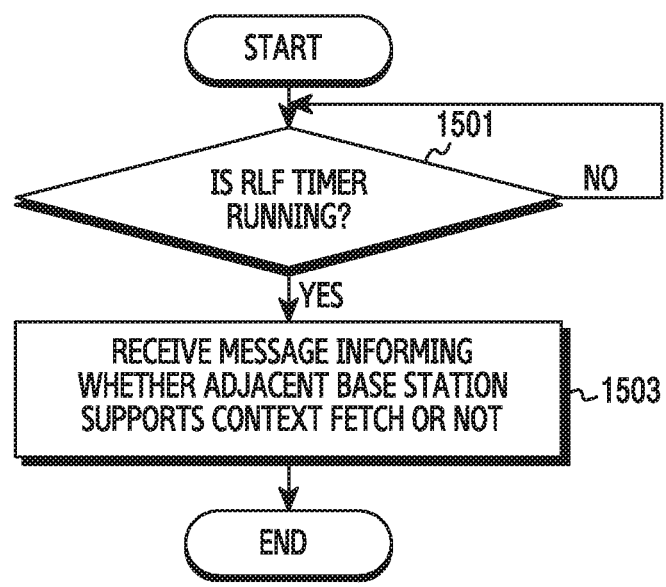
FIG. 15 illustrates an operation procedure of a terminal in a mobile communication system according to another exemplary embodiment of the present disclosure.

FIG. 15 illustrates an operation procedure of a terminal in a mobile communication system according to another exemplary embodiment of the present disclosure.

Referring to FIG. 15, the terminal determines whether an RLF timer is in progress in step 1501. The RLF timer is to count the time during which the satisfied condition of the RLF should be maintained to declare the RLF. The RLF timer progresses when a block error rate is less than a threshold value or channel quality is less than a threshold value.

When the RLF timer is in progress, the terminal proceeds to step 1503 to receive, from an adjacent base station, a message informing whether the adjacent base station supports context fetch or not. The message may be broadcasted through a BCH of the adjacent base station. For example, the message may be a part of system information of the adjacent base station. When the operation frequencies of the adjacent base station and a serving base station are different, the terminal may change a reception frequency and then try to receive the message.

Figure 16:
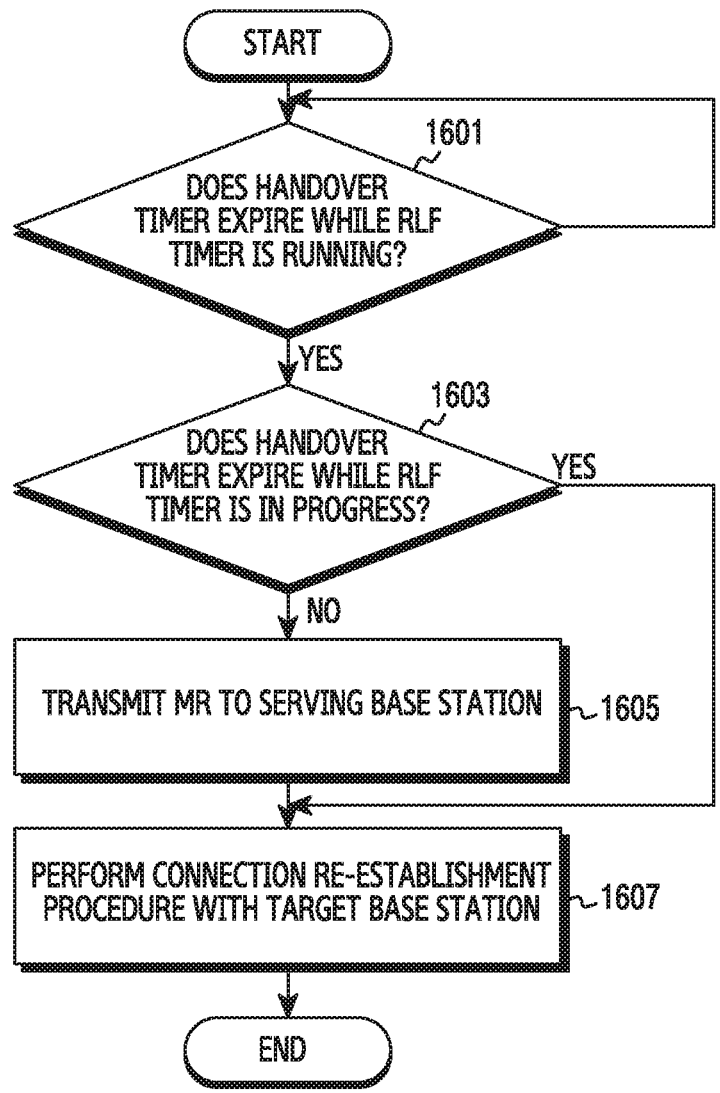
FIG. 16 illustrates an operation procedure of a terminal in a mobile communication system according to another exemplary embodiment of the present disclosure.

FIG. 16 illustrates an operation procedure of a terminal in a mobile communication system according to another exemplary embodiment of the present disclosure.

Referring to FIG. 16, the terminal determines whether a handover timer expires or not while an RLF timer is in progress in step 1601. Since the RLF timer progresses due to a block error rate or channel quality and the handover timer progresses due to received power of signals, both the RLF timer and the handover timer progress when the terminal is located at a cell boundary. In this case, the terminal determines whether the handover timer expires first.

When the handover timer expires first, the terminal proceeds to step 1603 to determine whether a target base station supports context fetch or not. It may be determined whether the target base station supports the context fetch or not through a message received from a serving base station or a message received from the target base station. That is, although not shown in FIG. 16, the terminal may receive, from the serving base station or the target base station, a message informing whether at least one base station including the target base station supports the context fetch or not, and know whether the target base station supports the context fetch or not through the message.

When the target base station does not support the context fetch, the terminal proceeds to step 1605 to transmit an MR to the serving base station. That is, since the target base station cannot acquire the context of the terminal through the context fetch, the terminal transmits the MR in order for the serving base station to provide the context of the terminal to the target base station. According to an exemplary embodiment of the present disclosure, the terminal may transmit the MR after transmitting a scheduling request or a BSR. According to another exemplary embodiment of the present disclosure, the terminal may transmit the MR through a reserved resource.

After the MR is transmitted or when the target base station supports the context fetch, the terminal proceeds to step 1607 to perform a connection re-establishment procedure with the target base station. Since the target base station can acquire the context of the terminal by the transmission of the MR or through the context fetch, the terminal may perform the connection re-establishment with the target base station.

Figure 17:
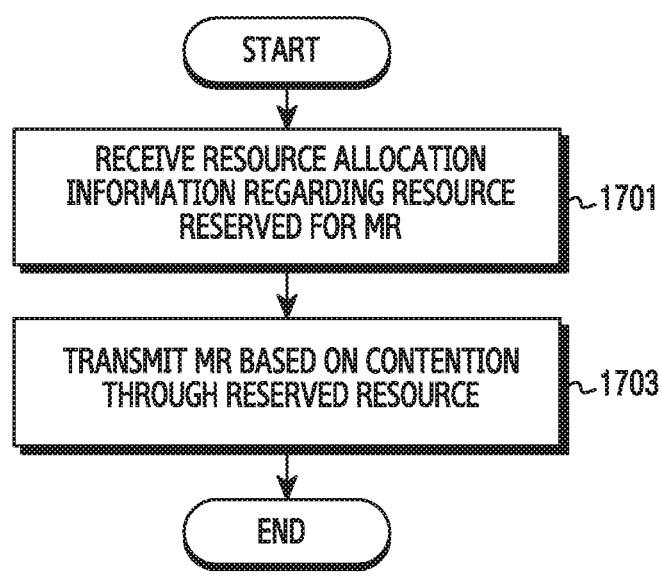
FIG. 17 illustrates an operation procedure of a terminal in a mobile communication system according to another exemplary embodiment of the present disclosure.

FIG. 17 illustrates an operation procedure of a terminal in a mobile communication system according to another exemplary embodiment of the present disclosure.

Referring to FIG. 17, the terminal receives resource allocation information regarding a resource reserved for an MR in step 1701. The reserved resource refers to a resource which is pre-allocated to transmit the MR. According to an exemplary embodiment of the present disclosure, the terminal may further receive a reserved resource indicator indicating a rule of using the reserved resource in addition to the resource allocation information. For example, at least one of the reserved resource indicator and the resource allocation information may be broadcasted through a BCH. In the case of FIG. 17, the reserved resource indicator indicates a contention method.

Thereafter, the terminal transmits the MR based on content through the reserved resource in step 1703. In this case, according to an exemplary embodiment of the present disclosure, the terminal transmits the MR through the reserved resource only when the handover timer expires first while both the RLF timer and the handover timer are in progress. When the MR is successfully transmitted, a target base station may be provided with the context of the terminal by the serving base station.

Figure 18:
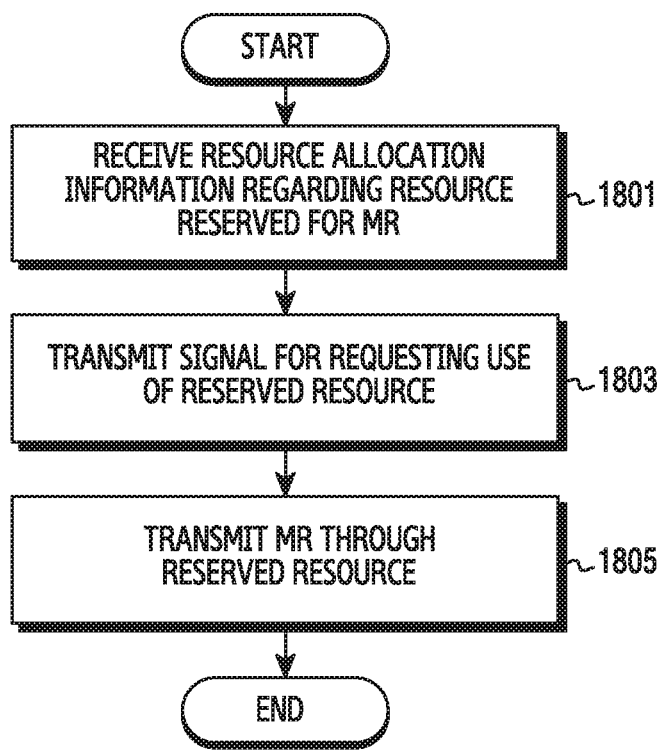
FIG. 18 illustrates an operation procedure of a terminal in a mobile communication system according to another exemplary embodiment of the present disclosure.

FIG. 18 illustrates an operation procedure of a terminal in a mobile communication system according to another exemplary embodiment of the present disclosure.

Referring to FIG. 18, the terminal receives resource allocation information regarding a resource reserved for an MR in step 1801. The reserved resource refers to a resource which is pre-allocated to transmit the MR. According to an exemplary embodiment of the present disclosure, the terminal may further receive at least one of a reserved resource indicator indicating a rule of using the reserved resource, and random access code allocation information allocated to request use of the reserved resource, in addition to the resource allocation information. For example, at least one of the reserved resource indicator, the resource allocation information, and the random access code allocation information may be broadcasted through a BCH. In the case of FIG. 18, the reserved resource indicator indicates a request and response method.

Thereafter, the terminal transmits a signal for requesting use of the reserved resource in step 1803. The signal for requesting the use of the reserved resource may be referred to as a reserved resource access request. The signal for requesting the use of the reserved resource may have a format of a random access signal. In this case, the terminal may transmit at least one code allocated based on the random access code allocation information. In this case, according to an exemplary embodiment of the present disclosure, the terminal may request the use of the reserved resource only when the handover timer expires first while both the RLF timer and the handover timer are in progress.

After transmitting the signal for requesting the use of the reserved resource, the terminal proceeds to step 1805 to transmit the MR through the reserved resource. When the MR is successfully transmitted, the target base station may be provided with the context of the terminal by the serving base station. According to an exemplary embodiment of the present disclosure, the terminal may transmit the MR after receiving a response allowing the use of the reserved resource although not shown in FIG. 18. According to another exemplary embodiment of the present disclosure, the terminal may transmit the signal for requesting the use of the reserved resource, and transmit the MR after a predetermined number of frames pass, without receiving the response.

Figure 19:
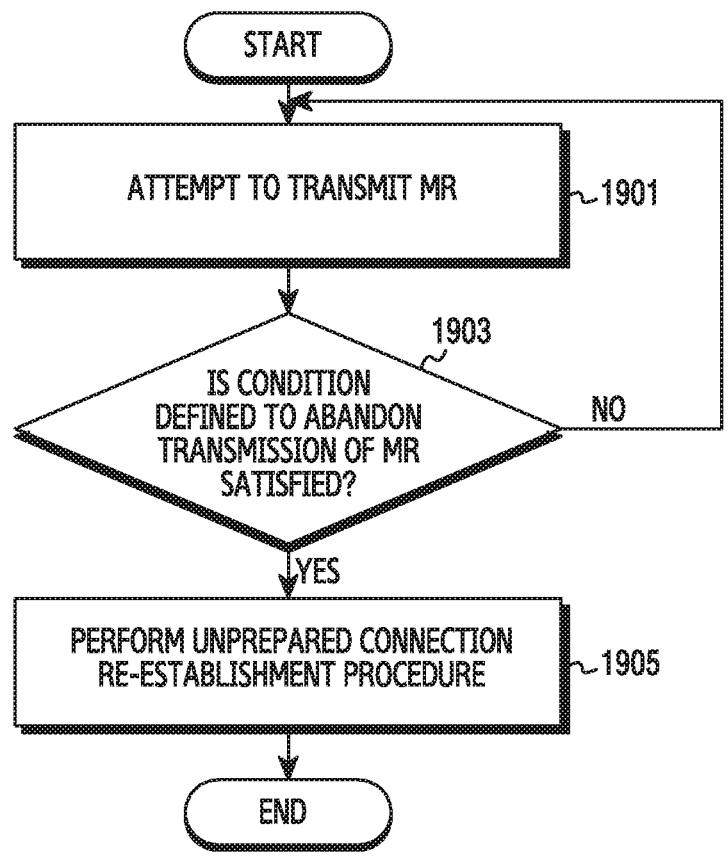
FIG. 19 illustrates an operation procedure of a terminal in a mobile communication system according to another exemplary embodiment of the present disclosure.

FIG. 19 illustrates an operation procedure of a terminal in a mobile communication system according to another exemplary embodiment of the present disclosure.

Referring to FIG. 19, the terminal tries to transmit an MR in step 1901. According to an exemplary embodiment of the present disclosure, the terminal may transmit the MR through an allocated uplink resource after transmitting a scheduling request or a BSR. In addition, according to another exemplary embodiment of the present disclosure, the terminal may transmit the MR through a reserved resource. When the reserved resource is used, the terminal may further transmit a signal for requesting the use of the reserved resource prior to transmitting the MR.

Next, the terminal proceeds to step 1903 to determine whether a condition defined to abandon transmission of the MR is satisfied or not. When it is difficult to successfully transmit the MR, abandoning the transmission of the MR and performing unprepared connection re-establishment may result in a relatively short interruption time. The condition defined to abandon the transmission of the MR may be defined in various ways according to specific exemplary embodiments. For example, the defined condition may include at least one condition of a condition indicating whether average channel quality is lower than a threshold, a condition indicating whether the number of times of reception errors is greater than a threshold value, and a condition indicating whether an elapsed time of the RLF timer exceeds a threshold value.

When the condition defined to abandon the transmission of the MR is satisfied, the terminal proceeds to step 1905 to perform an unprepared connection re-establishment procedure. For example, the terminal may select a cell, perform a random access to a selected base station, may be allocated an uplink resource, perform an NAS recovery procedure, and then perform connection establishment.

Figure 20:
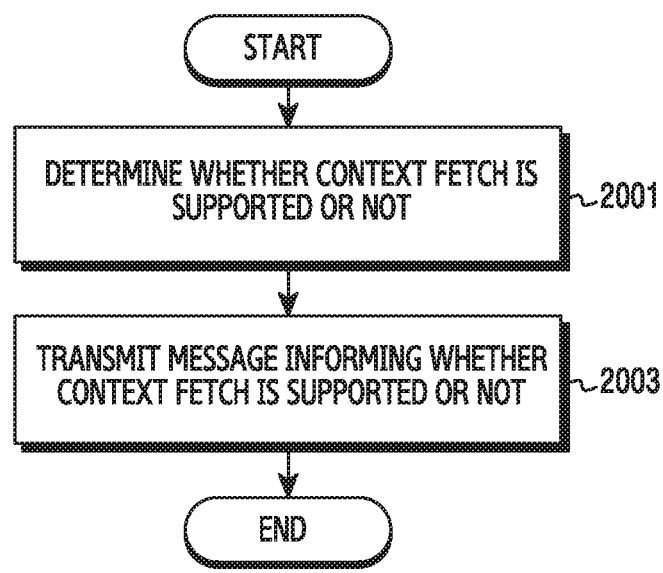
FIG. 20 illustrates an operation procedure of a base station in a mobile communication system according to an exemplary embodiment of the present disclosure.

FIG. 20 illustrates an operation procedure of a base station in a mobile communication system according to an exemplary embodiment of the present disclosure.

Referring to FIG. 20, the base station determines whether context fetch is supported or not in step 2001. The base station identifies whether the context fetch is supported prior to transmitting a message informing whether the context fetch is supported or not. For example, the base station may determine whether the context fetch is supported or not by asking other adjacent base stations or an MME at least one of whether they store a context of a specific terminal, whether they will maintain the context, and whether they are able to transmit the context within a predetermined delay time in response to a context request. In this case, it is determined whether the context fetch is supported or not with respect to the base station or at least one other base station. That is, what object is determined in step 2001 may depend on what is indicated by the message as an object supporting the context fetch.

Thereafter, the base station proceeds to step 2003 to transmit the message informing whether the context fetch is supported or not. The message may indicate one of whether the base station supports the context fetch, whether base stations included in an unit area where the context fetch is applied and the base station belongs support the context fetch, whether at least one adjacent base station of the base station supports the context fetch, and whether subordinate pico base stations having coverage overlaid with the base station support the context fetch or not. For example, when the message indicates whether a plurality of base stations support the context fetch or not, the message may include identification information of each of the base stations and an indicator corresponding to each of the base stations. In addition, when the message indicates whether a plurality of base stations support the context fetch, the message may indicate only at least one base station which supports the context fetch or only at least one base station which does not support the context fetch. The base station may broadcast the message through a BCH.

Figure 21:
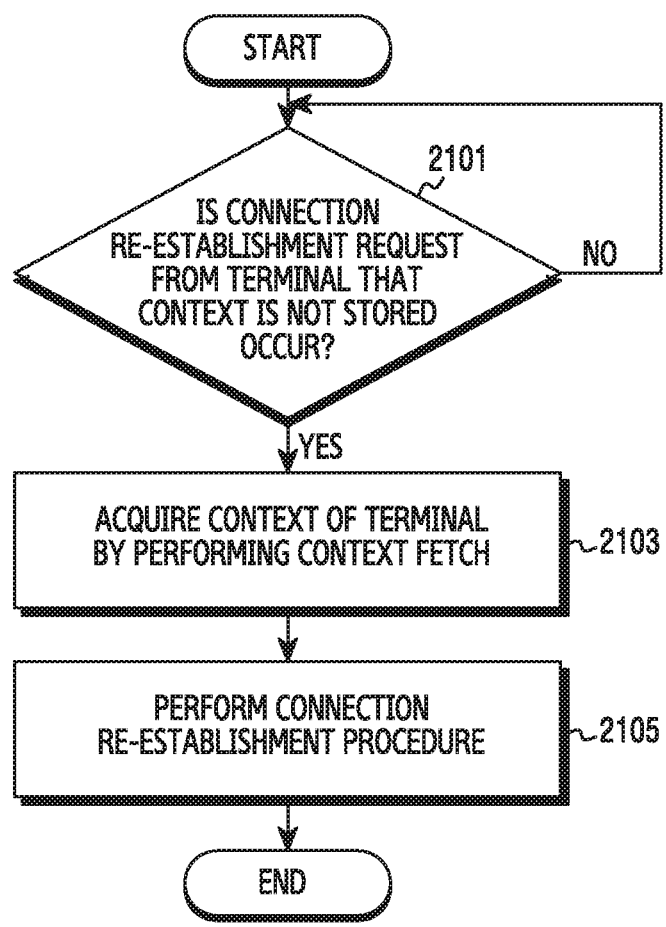
FIG. 21 illustrates an operation procedure of a base station in a mobile communication system according to another exemplary embodiment of the present disclosure.

FIG. 21 illustrates an operation procedure of a base station in a mobile communication system according to another exemplary embodiment of the present disclosure.

Referring to FIG. 21, the base station determines whether a connection re-establishment request is generated from a terminal which does not store a context in operation 2101. The base station may receive a random access request from the terminal and allocate an uplink resource through the random access procedure. Thereafter, when a connection re-establishment request is received through the uplink resource, the base station determines whether a context of the terminal which has transmitted the connection re-establishment request is stored or not.

When the connection re-establishment request is generated from the terminal which does not store the context, the base station proceeds to step 2103 to acquire the context of the terminal through context fetch. For example, the base station may acquire the context of the terminal from at least one of a serving base station, an upper node (for example, an MME), and an upper macro base station before the terminal declares an RLF. In other words, the base station may request the context of the terminal from other base stations or other nodes, and receives the context of the terminal.

After acquiring the context of the terminal, the base station proceeds to step 2105 to perform a connection re-establishment procedure with the terminal. For example, the base station allocates an uplink resource through a random access procedure of the terminal, and receives a connection re-establishment request message through the uplink resource. In addition, the base station may perform a connection re-establishment procedure and then transmit a connection re-establishment message to the terminal.

Figure 22:
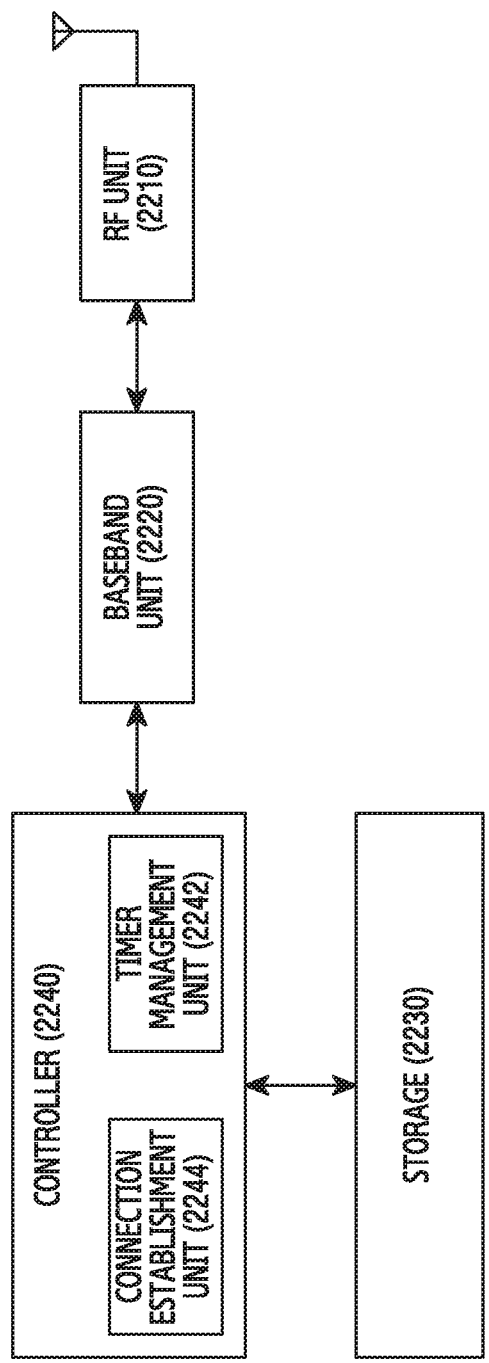
FIG. 22 illustrates a block configuration of a terminal in a mobile communication system according to an exemplary embodiment of the present disclosure.

FIG. 22 illustrates a block configuration of a terminal in a mobile communication system according to an exemplary embodiment of the present disclosure.

Referring to FIG. 22, the terminal includes a Radio Frequency (RF) processor 2210, a baseband processor 2220, a storage 2230, and a controller 2240.

The RF processor 2210 performs a function to transmit and receive signals through a radio channel, such as converting a band of signals, amplifying, etc. That is, the RF processor 2210 up-converts baseband signals provided from the baseband processor 2220 into RF band signals, and then transmits the signals through an antenna, and down-converts RF band signals received through the antenna into baseband signals. For example, the RF processor 2210 may include a transmission filter, a reception filter, an amplifier, a mixer, an oscillator, a Digital to Analog Converter (DAC), an Analog to Digital Converter (ADC), etc. In FIG. 22, only a single antenna is illustrated, but the terminal may include a plurality of antennas. In addition, the RF processor 2210 may include a plurality of RF chains.

The baseband processor 2220 performs a conversion function between a baseband signal and a bit string according to a physical layer standard of the system. For example, when transmitting data, the baseband processor 2220 generates complex symbols by encoding and modulating a transmission bit string. In addition, when receiving data, the baseband processor 2220 may restore a reception bit string by demodulating and decoding the baseband signals provided from the RF processor 2210. For example, when transmitting data, the baseband processor 2220 generates complex symbols by encoding and modulating the transmission bit string, maps the complex symbols onto subcarriers, and then configures Orthogonal Frequency Division Multiplexing (OFDM) symbols by performing an Inverse Fast Fourier Transform (IFFT) operation and inserting a Cyclic Prefix (CP). In addition, when receiving data, the baseband processor 2220 divides the baseband signals provided from the RF processor 2210 on an OFDM symbol basis, restores the signals mapped onto the subcarriers by performing an FFT operation, and then restores the reception bit string by demodulating and decoding. The baseband processor 2220 and the RF processor 2210 may transmit and receive signals as described above. Accordingly, the baseband processor 2220 and the RF processor 2210 may be referred to as a transmitter, a receiver, a transceiver, a communication unit, or a wireless communication unit.

The storage 2230 stores data such as basic programs, application programs, setting data, etc. for the operations of the terminal. In addition, the storage 2230 provides stored data in response to a request of the controller 2240.

The controller 2240 controls the overall operations of the terminal. For example, the controller 2240 transmits and receives signals through the baseband processor 2220 and the RF processor 2210. In addition, the controller 2240 records data on or reads out data from the storage 2240. According to an exemplary embodiment of the present disclosure, the controller 2240 includes a timer management unit 2242 which controls an RLF timer and a handover timer, and a connection establishment unit 2244 which controls a connection re-establishment procedure according to whether a target base station supports context fetch. For example, the controller 2240 controls the terminal to perform the procedures shown in FIGS. 14 to 19. According to exemplary embodiments of the present disclosure, the operations of the controller 2240 are as follows.

According to an exemplary embodiment of the present disclosure, the controller 2240 receives a message informing whether context fetch is supported or not from a base station through the RF processor 2210 and the baseband processor 2220, and determines whether the base station or at least one other base station supports the context fetch or not through the message. The message may indicate one of whether the base station supports the context fetch, whether base stations included in an unit area where the context fetch is applied and the base station belongs support the context fetch or not, whether at least one adjacent base station of the base station supports the context fetch, and whether subordinate pico base stations having coverage overlaid with the base station support the context fetch or not. The message may be broadcasted through a BCH.

According to an exemplary embodiment of the present disclosure, when the RLF timer is in progress, the controller 2230 receives a message informing whether an adjacent base station supports the context fetch or not from the adjacent base station through the RF processor 2210 and the baseband processor 2220. When the operation frequencies of the adjacent base station and a serving base station are different from each other, the controller 2240 may control the RF processor 2210 to change a reception frequency and then may try to receive the message.

According to an exemplary embodiment of the present disclosure, the controller 2240 controls the RLF timer and the handover timer to progress according to a predefined condition. When the handover timer expires while the RLF timer is in progress, the controller 2240 declares an REF. In this case, when the target base station does not support the context fetch, the controller 2240 controls to transmit an MR to the serving base station and then declares the RLF. After the MR is transmitted or when the target base station supports the context fetch, the controller 2240 performs a connection re-establishment procedure with the target base station.

According to an exemplary embodiment of the present disclosure, the controller 2240 receives resource allocation information regarding a resource reserved for the MR. According to an exemplary embodiment of the present disclosure, the controller 2240 may further receive at least one of a reserved resource indicator indicating a rule of using the reserved resource, and random access code allocation information allocated to request use of the reserved resource, in addition to the resource allocation information. Thereafter, when the handover timer expires first while the RLF timer is in progress, and a target base station does not support the context fetch, the controller 2240 transmits the MR through the reserved resource. According to an exemplary embodiment of the present disclosure, the controller 2240 may transmit the MR based on contention or may transmit the MR after requesting the use of the reserved resource. When requesting the use of the reserved resource, the controller 2240 may transmit the MR after receiving a response allowing the use of the reserved resource.

According to an exemplary embodiment of the present disclosure, the controller 2240 tries to transmit the MR. In the process of attempting to transmit the MR, the controller 2240 determines whether a condition defined to abandon the transmission of the MR is satisfied. For example, the condition defined to abandon the transmission of the MR may include at least one of a condition indicating whether average channel quality is lower than a threshold value, a condition indicating whether the number of times of reception errors is greater than a threshold value, and a condition indicating whether the elapsed time of the RLF timer exceeds a threshold value. When the condition defined to abandon the transmission of the MR is satisfied, the controller 2240 may stop transmitting the MR and performs an unprepared connection re-establishment procedure.

Figure 23:
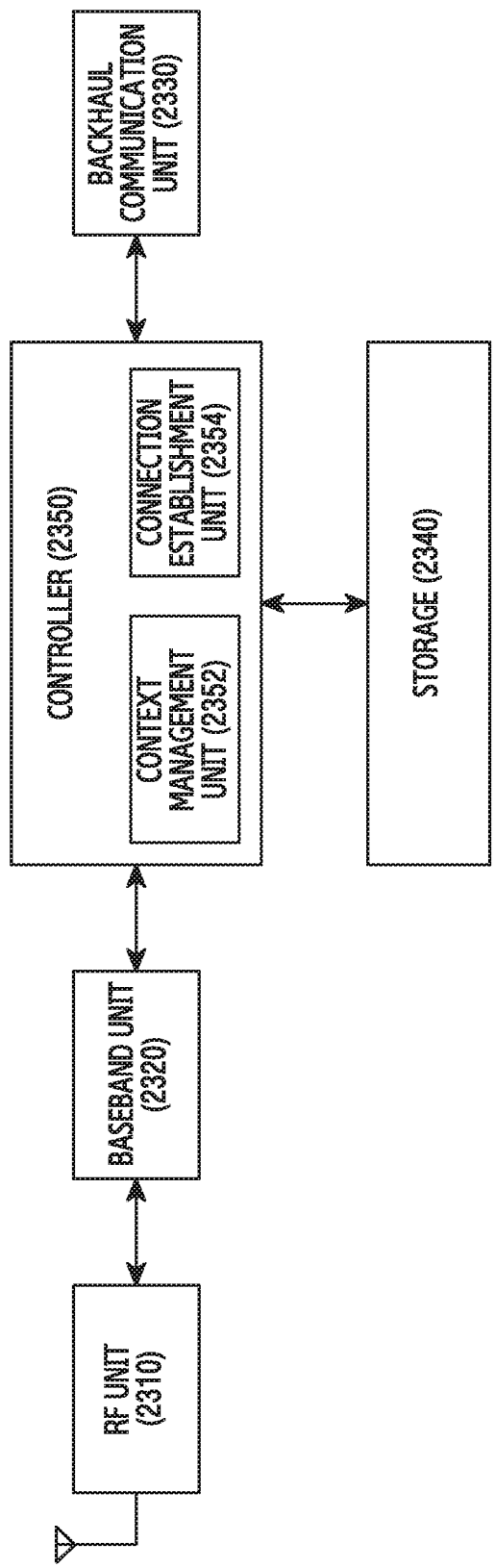
FIG. 23 illustrates a block configuration of a base station in a mobile communication system according to an exemplary embodiment of the present disclosure.

FIG. 23 illustrates a block configuration of a base station in a mobile communication system according to an exemplary embodiment of the present disclosure.

As shown in FIG. 23, the base station includes an RF processor 2310, a baseband processor 2320, a backhaul communication unit 2330, a storage 2340, and a controller 2350.

The RF processor 2310 performs a function to transmit and receive signals through a radio channel, such as converting a band of signals, amplifying, etc. That is, the RF processor 2310 up-converts baseband signals provided from the baseband processor 2320 into RF band signals, and then transmits the signals through an antenna, and down-converts RF band signals received through the antenna into baseband signals. In FIG. 23, only a single antenna is illustrated, but the base station may include a plurality of antennas. In addition, the RF processor 2310 may include a plurality of RF chains.

The baseband processor 2320 performs a conversion function between a baseband signal and a bit string according to a physical layer standard of the system. For example, when transmitting data, the baseband processor 2320 generates complex symbols by encoding and modulating a transmission bit string. In addition, when receiving data, the baseband processor 2320 may restore a reception bit string by demodulating and decoding the baseband signals provided from the RF processor 2310. For example, when transmitting data, the baseband processor 2320 generates complex symbols by encoding and modulating the transmission bit string, maps the complex symbols onto subcarriers, and then configures OFDM symbols by performing an IFFT operation and inserting a CP. In addition, when receiving data, the baseband processor 2320 divides the baseband signals provided from the RF processor 2310 on an OFDM symbol basis, restores the signals mapped onto the subcarriers by performing an FFT operation, and then restores the reception bit string by demodulating and decoding. The baseband processor 2320 and the RF processor 2310 may transmit and receive signals as described above. Accordingly, the baseband processor 2320 and the RF processor 2310 may be referred to as a transmitter, a receiver, a transceiver, a wireless communication unit, or a communication unit.

The backhaul communication unit 2330 provides an interface for communicating with other nodes (for example, other base stations, a pico base station, a macro base station, an MME, etc.) within a network. That is, the backhaul communication unit 2330 converts bit strings which are transmitted from the base station to other nodes, for example, other base stations, a core network, etc., into physical signals, and converts physical signals received from other nodes into bit strings.

The storage 2340 stores data such as basic programs, application programs, setting data, etc. for the operations of the base station. In addition, the storage 2340 provides stored data in response to a request of the controller 2350.

The controller 2350 controls the overall operations of the base station. For example, the controller 2350 transmits and receives signals through the baseband processor 2320 and the RF processor 2310 or through the backhaul communication unit 2330. In addition, the controller 2350 records data on or reads out data from the storage 2340. According to an exemplary embodiment of the present disclosure, the controller 2350 includes a context management unit 2352 which manages a context of a terminal, and a connection establishment unit 2354 which performs a connection re-establishment or connection establishment procedure with the terminal. For example, the controller 2350 controls the base station to perform the procedures shown in FIGS. 20 and 21. The operations of the controller 2350 according to exemplary embodiments of the present disclosure are as follows.

According to an exemplary embodiment of the present disclosure, the controller 2350 generates a message informing whether context fetch is supported or not, and then transmits the message through the baseband processor 2320 and the RF processor 2310. The message may indicate one of whether the base station supports the context fetch or not, whether base stations included in an unit area where the context fetch is applied and the base station belongs support the context fetch or not, whether at least one adjacent base station of the base station supports the context fetch or not, and whether subordinate pico base stations having coverage overlaid with the base station support the context fetch or not. For example, when the message indicates whether a plurality of base stations support the context fetch, the message may include identification information of each of the base stations and an indicator corresponding to each of the base stations. In addition, when the message indicates whether a plurality of base stations support the context fetch, the message may indicate only at least one base station which supports the context fetch or may indicate only at least one base station which does not support the context fetch. The controller 2350 may broadcast the message through a BCH.

According to an exemplary embodiment of the present disclosure, when a connection re-establishment request is generated from a terminal which does not store the context, the controller 2350 may acquire the context of the terminal through context fetch. For example, the controller 2350 may acquire the context of the terminal from at least one of a serving base station, an upper node (for example, an MME), and an upper macro base station before the terminal declares the RLF. In other words, the controller 2350 may request the context of the terminal from other base stations or other nodes, and receives the context of the terminal. After acquiring the context of the terminal, the controller 2350 may perform a connection re-establishment procedure with the terminal.

According to an exemplary embodiment of the present disclosure, the controller 2350 may reserve a resource for transmitting an MR, that is, allocate the resource in advance. The resource reserved for the MR is for a terminal in which a handover timer expires first while an RLF timer is in progress, and may be always emptied or may be emptied only in response to a request being generated. For example, when the resource is emptied only in response to the request being generated, the controller 2350 may allocate the reserved resource for other purposes prior to receiving the request. However, when a signal for requesting use of the reserved resource is received, the controller 2350 empties the reserved resource. Herein, the signal for requesting the use of the reserved resource may be a random access signal. In this case, the controller 2350 may transmit at least one of resource allocation information regarding the reserved resource, a reserved resource indicator indicating a rule of using the reserved resource, and random access code allocation information allocated to request the use of the reserved resource.

Methods based on the embodiments disclosed in the claims or specification of the present disclosure may be implemented in hardware, software, or a combination of hardware and software.

When implemented in software, a computer readable storage medium for storing one or more programs (software modules) may be provided. The one or more programs stored in the computer readable storage medium are configured for execution by one or more processors in an electronic device. The one or more programs include instructions for allowing the electronic device to execute the methods based on the embodiments disclosed in the claims or specification of the present disclosure.

The program (software module or software) may be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a Local Area Network (LAN), a Wide LAN (WLAN), or a Storage Area Network (SAN) or a communication network configured by combining these networks. The storage device may access via an external port to a device which performs the exemplary embodiments of the present disclosure. In addition, a separate storage device on a communication network may access a device which performs the exemplary embodiments of the present disclosure.

In the exemplary embodiments of the present disclosure described above, the elements included in the present disclosure are expressed in a singular form or a plural form according to a specific embodiment. However, the singular form or plural form is just selected to suit to a suggested situation for convenience of explanation, and the present disclosure is not limited to the single or plural elements. Even when an element is expressed in a plural form, the element may be provided as a single element, and, even when an element is expressed in a singular form, the element may be provided as a plurality of elements.

While specific embodiments have been described in the detailed descriptions of the present disclosure, various changes can be made within a limit without departing from the scope of the present disclosure. Therefore, the scope of the present disclosure should not be limited to and defined by the above-described exemplary embodiments, and should be defined not only by the appended claims but also by the equivalents to the scopes of the claims.

What is claimed is:

1. An apparatus for a terminal in a mobile communication system, the apparatus comprising:
   a transceiver of the terminal configured to receive, from a first base station, a message informing whether to support fetching a context of the terminal; and
   at least one processor configured to:
      determine whether a second base station supports the fetching of the context based on the message,
      if the second base station supports the fetching of the context, perform a connection reestablishment to access the second base station without transmitting a measurement report, in response to detecting a radio link failure (RLF), and
      if the second base station does not support the fetching of the context, transmit the measurement report and perform the connection reestablishment to access the second base station, in response to detecting the RLF.

2. The apparatus of claim 1, wherein the transceiver is further configured to transmit the measurement report through a resource which is reserved to transmit the measurement report without requesting a grant of an uplink resource.

3. The apparatus of claim 1, wherein the transceiver is further configured to:
   transmit a signal for requesting to use a resource which is reserved for the measurement report without requesting a grant of an uplink resource, and
   transmit the measurement report through the reserved resource.

4. The apparatus of claim 1, wherein the transceiver is further configured to receive at least one of resource allocation information regarding a resource which is reserved for the measurement report, an indicator indicating a rule of using the reserved resource, and allocation information for a random access code allocated to request to use the reserved resource.

5. The apparatus of claim 1, wherein the at least one processor is further configured to:
if at least one predefined condition is satisfied while transmission of the measurement report is attempted, stop transmitting the measurement report, and
perform a procedure for generating a context and a procedure for a connection establishment to access the target base station.

6. An apparatus for a first base station in a mobile communication system, the apparatus comprising:
at least one processor configured to generate a message informing whether a second base station supports fetching a context of a terminal; and
a transceiver configured to transmit, to the terminal, the message,
wherein the message informing that the second base station supports the fetching of the context allows the terminal to perform a connection reestablishment to access the second base station without transmitting a measurement report, in response to detecting a radio link failure (RLF), and
wherein the message informing that the second base station does not support the fetching of the context allows the terminal to transmit the measurement report and perform the connection reestablishment to access the second base station, in response to detecting the RLF.

7. The apparatus of claim 6, wherein the transceiver is further configured to transmit at least one of resource allocation information regarding a resource which is reserved for the measurement report, an indicator indicating a rule of using the reserved resource, and allocation information for a random access code allocated to request to use the reserved resource.

8. The apparatus of claim 6,
wherein the at least one processor is further configured to allocate a resource reserved for the measurement report to a terminal, and
wherein the transceiver receives the measurement report through the reserved resource.

9. The apparatus of claim 8,
wherein the transceiver is further configured to receive a signal for requesting to use the reserved resource, and
wherein the at least one processor is further configured to control to empty the reserved resource.

10. The apparatus of claim 6, wherein, if a connection re-establishment request from a terminal that a context is not stored occurs, the at least one processor is further configured to control to acquire the context of the terminal by fetching the context.

11. The apparatus of claim 6, wherein the message indicates one of whether the first base station supports fetching the context, whether base stations included in a unit area where the first base station belongs support to fetching the context, whether at least one adjacent base station of the first base station supports fetching the context, and whether subordinate small base stations having coverage overlaid with the first base station support to fetching the context.

12. The apparatus of claim 1, wherein the message indicates one of whether the first base station supports fetching the context, whether base stations included in a unit area where the first base station belongs support to fetching the context, whether at least one adjacent base station of the first base station supports fetching the context, and whether subordinate small base stations having coverage overlaid with the first base station support to fetching the context.

13. A method for operating a terminal in a mobile communication system, the method comprising:
receiving, from a first base station, a message informing whether to support to fetching a context of the terminal;
determining whether a second base station supports the fetching of the context based on the message;
if the second base station supports the fetching of the context, performing a connection reestablishment to access the second base station without transmitting a measurement report, in response to detecting a radio link failure (RLF); and
if the second base station does not support the fetching of the context, transmitting the measurement report and performing the connection reestablishment to access the second base station, in response to detecting the RLF.

14. The method of claim 13, wherein the message indicates one of whether the first base station supports fetching the context, whether base stations included in a unit area where the first base station belongs support to fetching the context, whether at least one adjacent base station of the first base station supports fetching the context, and whether subordinate small base stations having coverage overlaid with the first base station support to fetching the context.

15. The apparatus of claim 5, wherein the at least one predefined condition is defined based on at least one of a channel quality, a number of times of reception errors, and a timer.

16. The apparatus of claim 1,
wherein the first base station is a macro base station, and
wherein the second base station is a small base station.

17. The method of claim 13, further comprising:
if at least one predefined condition is satisfied while transmission of the measurement report is attempted, stop transmitting the measurement report, and
perform a procedure for generating a context and a procedure for a connection establishment to access the target base station.

18. The method of claim 17, wherein the at least one predefined condition is defined based on at least one of a channel quality, a number of times of reception errors, and a timer.

19. The method of claim 13,
wherein the first base station is a macro base station, and
wherein the second base station is a small base station.

* * * * *